US007146446B2

(12) United States Patent
Chu

(10) Patent No.: US 7,146,446 B2
(45) Date of Patent: Dec. 5, 2006

(54) MULTIPLE MODULE COMPUTER SYSTEM AND METHOD

(75) Inventor: William W. Y. Chu, Los Altos, CA (US)

(73) Assignee: Acqis Technology, Inc., Mountain View, CA (US)

( * ) Notice: Subject to any disclaimer, the term of this patent is extended or adjusted under 35 U.S.C. 154(b) by 18 days.

(21) Appl. No.: 11/113,401

(22) Filed: Apr. 22, 2005

(65) Prior Publication Data

US 2005/0195575 A1 Sep. 8, 2005

Related U.S. Application Data

(63) Continuation of application No. 10/772,214, filed on Feb. 3, 2004, which is a continuation of application No. 09/569,758, filed on May 12, 2000, now Pat. No. 6,718,415.

(60) Provisional application No. 60/134,122, filed on May 14, 1999.

(51) Int. Cl.
*G06F 13/00* (2006.01)

(52) U.S. Cl. ............... 710/301; 710/313; 710/315; 710/63; 710/72; 709/227; 709/248

(58) Field of Classification Search ........ 710/305–315, 710/300–304, 62–64, 72–73; 709/214, 217, 709/219, 226, 227
See application file for complete search history.

(56) References Cited

U.S. PATENT DOCUMENTS

| 3,996,585 A | 12/1976 | Hogan |
| 4,623,964 A | 11/1986 | Getz et al. |
| 4,700,362 A | 10/1987 | Todd et al. |
| 4,769,764 A | 9/1988 | Levanon |
| 4,872,091 A | 10/1989 | Maniwa et al. |
| 4,890,282 A | 12/1989 | Lambert et al. |
| 4,918,572 A | 4/1990 | Tarver et al. |
| 4,939,735 A | 7/1990 | Fredericks et al. |
| 5,056,141 A | 10/1991 | Dyke |
| 5,086,499 A | 2/1992 | Mutone |
| 5,251,097 A | 10/1993 | Simmons et al. |
| 5,278,509 A | 1/1994 | Haynes et al. |

(Continued)

FOREIGN PATENT DOCUMENTS

EP  722138 A1  7/1996

(Continued)

OTHER PUBLICATIONS

Agerwala, T., "SP2 System Architecture" Systems Journal Scalable Parallel Computing, vol. 34, No. 2, 1995.

(Continued)

*Primary Examiner*—Mark H. Rinehart
*Assistant Examiner*—Raymond N Phan
(74) *Attorney, Agent, or Firm*—Townsend and Townsend and Crew LLP

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

80 Claims, 9 Drawing Sheets

U.S. PATENT DOCUMENTS

| | | | |
|---|---|---|---|
| 5,278,730 A | 1/1994 | Kikinis |
| 5,293,497 A | 3/1994 | Free |
| 5,311,397 A | 5/1994 | Harshberger et al. |
| 5,317,477 A | 5/1994 | Gillett |
| 5,319,771 A | 6/1994 | Takeda |
| 5,331,509 A | 7/1994 | Kikinis |
| 5,355,391 A | 10/1994 | Horowitz et al. |
| 5,428,806 A | 6/1995 | Pocrass |
| 5,436,857 A | 7/1995 | Nelson et al. |
| 5,463,742 A | 10/1995 | Kobayashi |
| 5,539,616 A | 7/1996 | Kikinis |
| 5,550,710 A | 8/1996 | Rahamim et al. |
| 5,550,861 A | 8/1996 | Chan et al. |
| 5,578,940 A | 11/1996 | Dillon |
| 5,600,800 A | 2/1997 | Kikinis et al. |
| 5,603,044 A | 2/1997 | Annapareddy et al. |
| 5,606,717 A | 2/1997 | Farmwald et al. |
| 5,608,608 A | 3/1997 | Flint et al. |
| 5,630,057 A | 5/1997 | Hait |
| 5,638,521 A | 6/1997 | Buchala et al. |
| 5,640,302 A | 6/1997 | Kikinis |
| 5,659,773 A | 8/1997 | Huynh et al. |
| 5,663,661 A | 9/1997 | Dillon et al. |
| 5,673,174 A | 9/1997 | Hamirani |
| 5,680,126 A | 10/1997 | Kikinis |
| 5,689,654 A | 11/1997 | Kikinis |
| 5,721,837 A | 2/1998 | Kikinis |
| 5,721,842 A | 2/1998 | Beasley et al. |
| 5,745,733 A | 4/1998 | Robinson |
| 5,752,080 A | 5/1998 | Ryan |
| 5,764,924 A | 6/1998 | Hong |
| 5,774,704 A | 6/1998 | Williams |
| 5,795,228 A | 8/1998 | Trumbull |
| 5,809,538 A | 9/1998 | Pollmann |
| 5,815,681 A | 9/1998 | Kikinis |
| 5,819,050 A | 10/1998 | Boehling et al. |
| 5,826,048 A | 10/1998 | Dempsey et al. |
| 5,848,249 A | 12/1998 | Garbus |
| 5,859,669 A | 1/1999 | Prentice |
| 5,907,566 A | 5/1999 | Benson et al. |
| 5,941,965 A | 8/1999 | Moroz |
| 5,948,047 A | 9/1999 | Jenkins et al. |
| 5,960,213 A | 9/1999 | Wilson |
| 5,968,144 A | 10/1999 | Walker et al. |
| 5,971,804 A | 10/1999 | Gallagher et al. |
| 5,977,989 A | 11/1999 | Lee et al. |
| 5,982,363 A | 11/1999 | Naif |
| 5,991,163 A | 11/1999 | Marconi et al. |
| 5,991,844 A | 11/1999 | Khosrowpour |
| 5,999,952 A | 12/1999 | Jenkins et al. |
| 6,002,442 A | 12/1999 | Li et al. |
| 6,003,105 A | 12/1999 | Vicard et al. |
| 6,011,546 A | 1/2000 | Bertram |
| 6,016,252 A | 1/2000 | Pignolet et al. |
| 6,028,643 A | 2/2000 | Jordan et al. |
| 6,029,183 A | 2/2000 | Jenkins et al. |
| 6,038,621 A | 3/2000 | Gale et al. |
| 6,040,792 A | 3/2000 | Watson et al. |
| 6,052,513 A | 4/2000 | MacLaren |
| 6,069,615 A | 5/2000 | Abraham et al. |
| 6,088,224 A | 7/2000 | Gallagher et al. |
| 6,088,752 A | 7/2000 | Ahern |
| 6,157,534 A | 12/2000 | Gallagher et al. |
| 6,163,464 A | 12/2000 | Ishibashi et al. |
| 6,175,490 B1 | 1/2001 | Papa et al. |
| 6,202,169 B1 | 3/2001 | Razzaghe-Ashrafi et al. |
| 6,208,522 B1 | 3/2001 | Manweiler et al. |
| 6,216,185 B1 | 4/2001 | Chu |
| 6,260,155 B1 | 7/2001 | Dellacona |
| 6,289,376 B1 | 9/2001 | Taylor et al. |
| 6,304,895 B1 | 10/2001 | Schneider et al. |
| 6,311,268 B1 | 10/2001 | Chu |
| 6,314,522 B1 | 11/2001 | Chu et al. |
| 6,317,329 B1 | 11/2001 | Dowdy et al. |
| 6,321,335 B1 | 11/2001 | Chu |
| 6,332,180 B1 | 12/2001 | Kauffman et al. |
| 6,345,330 B1 | 2/2002 | Chu |
| 6,366,951 B1 | 4/2002 | Schmidt |
| 6,378,009 B1 | 4/2002 | Pinkston, II et al. |
| 6,381,602 B1 | 4/2002 | Shoroff et al. |
| 6,393,561 B1 | 5/2002 | Hagiwara et al. |
| 6,401,124 B1 | 6/2002 | Yang et al. |
| 6,425,033 B1 | 7/2002 | Conway et al. |
| 6,452,789 B1 | 9/2002 | Pallotti et al. |
| 6,452,790 B1 | 9/2002 | Chu et al. |
| 6,453,344 B1 | 9/2002 | Ellsworth |
| 6,496,361 B1 | 12/2002 | Kim et al. |
| 6,549,966 B1 | 4/2003 | Dickens et al. |
| 6,564,274 B1 | 5/2003 | Heath et al. |
| 6,643,777 B1 | 11/2003 | Chu |
| 6,718,415 B1 | 4/2004 | Chu |
| 6,725,317 B1 | 4/2004 | Bouchier et al. |

FOREIGN PATENT DOCUMENTS

| | | |
|---|---|---|
| JP | 6-289953 | 10/1994 |
| WO | WO 92/18924 | 10/1992 |
| WO | WO 94/00097 | 1/1994 |
| WO | WO 95/13640 | 5/1995 |

OTHER PUBLICATIONS

Bernal, Carlos, product brochure entitled: "PowerSMP Series 4000", (Mar. 1998) <<http://www/winnetmag.com/Windows/Article/ArticleID/3095//3095.html, downloaded from web on Jun. 22, 2004, 2 pgs.

Cragle, Jonathan, "Density System 1100", May 1999) <<http://www.winnetmag.com/Windows/Article/ArticleID/5199/5199.html>>, downloaded from web on Jun. 21, 2004, 4 pgs.

Feldman, Jonathan, "Rack Steady: The Four Rack-Mounted Servers That Rocked Our Network", <<http://www.networkcomputing.com/shared/printArticle.jhtml?article=/910/910r3side1.htm... >> Jun. 23, 2004, 3 pgs.

Fetters, Dave, "Cubix High-Density Server Leads the Way With Standout Management Software", (Feb. 8, 1999) <<http://www.nwc.com/shared/printArticle.jhtml?article=/1003/1003r3full.html &pub=nwc>>, downloaded from web on Jun. 23, 2004, 5 pgs.

Gardner, Michael and Null, Christopher, "A Server Condominium", <<http://www.lantimes.com/testing/98jun/806a042a.html>>, Jun. 23, 2004, 3 pgs.

Harrison, Dave, "VME in the Military: The M1A2 Main Battle Tank Upgrade Relies on COTS VME" <<http://www.dy4.com>>, (Feb. 9, 1998), pp. 1-34.

Williams, Dennis, "Consolidated Servers", (Feb. 17, 1997) <<http://www.lantimes.com/testing/97compare/pcconsol.html>> downloaded from web on Jun. 23, 2004, 2 pgs.

Williams, Dennis, "Executive Summary: Consolidate Now", (Feb. 17, 1997) <<http://www.lantimes.com/testing/97feb/702b064a.html>> downloaded from web on Jun. 23, 2004, 2 pgs.

Williams, Dennis, "Top Scores for Useability and Openness", (Feb. 17, 1997) <<http://www.lantimes.com/testing/97feb/702b064a.html>> downloaded from web on Jun. 23, 2004, 2 pgs.

Williams, Dennis, "ChatCom Inc. Chatterbox", (Feb. 17, 1997) <<http://www.lantimes.com/testing/97feb/702b066a.html>> downloaded from web on Jun. 23, 2004, 3 pgs.

Williams, Dennis, "EVERSYS Corp. System 8000", (Feb. 17, 1997) <<http://www.lantimes.com/testing/97feb/702b70b.html>> downloaded from web on Jun. 22, 2004, 4 pgs.

Williams, Dennis, "Cubix Corp. ERS/FT II", (Feb. 17, 1997) <<http://www.lantimes.com/testing/97feb/702b068b.html>> downloaded from web on Jun. 23, 2004, 4 pgs.

Crystal Advertisement for "Rackmount Computers", ( © 2000-2004) <<http://www.crystalpc.com/products/roservers.asp>>, downloaded from web on Jun. 17, 2004, 8 pgs.

Crystal Advertisement for "QuickConnect® Cable Management", (© 2000-2004) <<http://www.crystalpc.com/products/quickconnect.asp>> downloaded from web on Jun. 17, 2004, 4 pgs.

Cubix Product Brochure entitled, "Density System", (© 2000) <<http://64.173.211.7/support/techinfo/system/density10.htm>> downloaded from web on Jun. 22, 2004, 3 pgs.

Cubix Product Brochure entitled, "Density System, Technical Specifications", (© 2000) <<http://64.173.211.7/support/techinfo/system/density/info/spec.htm>> downloaded from web on Jun. 22, 2004, 2 pgs.

Cubix Product Manual entitled, "Density System", Chapter 1—Introduction, (© 2000) <<http://64.173.211.7/support/techinfo/manuals/density/Chap-1.htm>> downloaded from web on Jun. 22, 2004, 5 pgs.

Cubix, "Click on the front panel that matches your system", (© 2000) <<http://64.173.211.7/support/techinfo/system/density/density.htm>>, downloaded from web on Jun. 22, 2004, 1 pg.

Cubix Product Manual entitled, "Density System", Chapter 2—Installation, (© 2000) <<http://64.173.211.7/support/techinfo/manuals/Chap-2.htm>> downloaded from web on Jun. 22, 2004, 9 pgs.

Cubix Product Manual entitled, "Density System", Chapter 3—Operation, (© 2000) <<http://64.173.211.7/support/techinfo/manuals/density/Chap-3.htm>> downloaded from web on Jun. 22, 2004, 4 pgs.

Cubix Product Manual entitled, "Density System", Chapter 4—Maintenance and Repair, (© 2000) <<http://64.173.211.7/support/techinfo/manuals/density/Chap-3.htm>> downloaded from web on Jun. 22, 2004, 5 pgs.

Cubix, "What are Groups?", (© 2000) <<http://64.173.211.7/support/techinfo/system/density/info/groups.htm>>, downloaded from web on Jun. 22, 2004, 3pgs.

Cubix, "SP 5200XS Series Plug-in Computers", (© 2000) <<http://64.173.211.7/support/techinfo/bc/sp5200xs/intro.htm>>, downloaded from web on Jun. 22, 2004, 2 pgs.

Cubix, "SP 5200XS Series Technical Specifications", (© 2000) <<http://64.173.211.7/support/techinfo/bc/sp5200xs/spec.htm>>, downloaded from web on Jun. 22, 2004, 2 pgs.

Cubix, "SP 5200 Series" Chapter 1—Introduction, (© 2000) <<http://64.173.211.7/support/techinfo/manuals/sp5200/chap-1.htm>>, downloaded from web on Jun. 22, 2004, 3 pgs.

Cubix, "SP 5200 Series" Chapter 2—Switches & Jumpers, (© 2000) <<http://64.173.211.7/support/techinfo/manuals/sp5200/chap-3.htm>>downloaded from web on Jun. 22, 2004, 3 pgs.

Cubix, "SP 5200 Series" Chapter 3—Installation, (© 2000) <<http://64.173.211.7/support/techinfo/manuals/sp5200/chap-2.htm>>downloaded from web on Jun. 22, 2004, 4 pgs.

Cubix, "SP 5200 Series" Chapter 4—Technical Reference, (© 2000) <<http://64.173.211.7/support/techinfo/manuals/sp5200/chap-4.htm>>, downloaded from web on Jun. 22, 2004, 3 pgs.

Cubix, "DP 6200 'D' Series Plug-In Computers" <<http://64.173.211.7/support/techinfo/bc/dp/6200d/intro.htm>>, downloaded from web on Jun. 22, 2004, 3 pgs.

Cubix, "Installing DP or SP Series Boards" (© 2000) <<http://64.173.211.7/support/techinfo/bc/dp/6200d/intro.htm>>, downloaded from web Jun. 22, 2004, 2 pgs.

Cubix, "Powering On/Off or Resetting Plug-In Computers in an Density System", (© 2000) <<http://64.173.211.7/support/techinfo/system/density/info/power.htm>>, downloaded from web on Jun. 22, 2004, 2 pgs.

Cubix, "Multiplexing Video, Keyboard & Mouse with Multiple Density Systems", (© 2000) <<http://64.173.211.7/support/techinfo/system/density/info/vkm-mux.htm>>, downloaded from web on Jun. 22, 2004, 2 pgs.

eBay Advertisement for "Total IT Group Network Engines", <<http://cgi.ebay.com/we/eBayISAPI.dll?ViewItem=5706388046&sspagename+STRK%3AMDBI%3AMEBI3AIT&rd=1>>, downloaded from web on Jun. 25, 2004, 1 pg.

"Features Chart", (Feb. 1, 1997) <<http://www.lantimes.com/testing/97feb/702b072a.html>>, downloaded from web on Jun. 23, 2004, 3 pgs.

Internet Telephone Roundup, "Industrial Computers", <<http://www.tmcnet.com/articles/itmag/0499/0499roundup.htm>>, downloaded from web on Jun. 23, 2004, 5 pgs.

Press Release: Hiawatha, Iowa, (Mar. 1, 1997) entitled "Crystal Group Products Offer Industrial PCs with Built-in Flexibility", <<http://www.crystalpc.com/news/pressreleases/prodpr.asp>>, downloaded from web on May 14, 2004, 2 pgs.

Press Release: Kanata, Ontario, Canada, (Apr. 1998) entitled "Enhanced COTS SBC from DY 4 Systems features 166MHz Pentium™ Processor" <<http://www.realtime-info.be/VPR/layout/display/pr.asp?PRID=363>>, 2 pgs.

Product Brochure enetitled "SVME/DM-192 Pentium® II Single Board Computer"(Jun. 1999) pp. 1-9.

Product Brochure entitled "System 8000", <<http://www.bomara.com/Eversys/briefDefault.htm>>, downloaded from web on Jun. 22, 2004, 4 pgs.

Product Brochure entitled: "ERS/FT II System", (© 2000) <<http://64.173.211.7/support/techinfo/system/ersft2/ersft2.htm>>, downloaded from web on Jun. 22, 2004, 4 pgs.

Product Manual entitled: "ERS II and ERS/FT II", Chap. 3, System Components, <<http://64.173.211.7/support/techinfo/manuals/ers2/ers2-c3.htm>>, downloaded from the web on Jun. 22, 2004, 21 pgs.

Product Manual entitled: "ERS II and ERS/FT II", Chap. 6, Component Installation, <<http://64.173.211.7/support/techinfo/manuals/ers2/ers2-c6.htm>>, downloaded from web on Jun. 22, 2004, 18 pgs.

Windows Magazine, "Cubix PowerSMP Series 4000", Nov. 1997, <http://<www.techweb.com/winmag/library/1997/1101/ntent008.htm>> downloaded from the web on Jun. 22, 2004, p. NT07.

MPL, "The First Rugged All-in-One Industrial 486FDX-133 MHz PC", IPM486/IPM5 User Manual, 1998, pp. 1-24.

CETIA Brochure "CETIA Powerengine CVME 603e"pp. 1-6 downloaded from the internet at http://www.cetia.com/ProductAddOns/wp-47-01.pdf on Feb. 15, 2006.

MPL Brochure "1st Rugged All in One industrial 486FDX-133 MHz PC" pp. 1-2, downloaded from the internaet at http://www.mpl.ch/DOCs/ds48600.pdf on Feb. 15, 2006.

MPL Brochure "IPM 486 Brochure/IPM5 User Manual" pp. 1-6 downloaded from the internet at http://www.mpl.ch/DOCs/u48600xd.pdf on Feb. 15, 2006.

Snyder, Joel "Better Management through consolidation" pp. 1-6 downloaded from the internet at http://www.opus1.com/www/jms/nw-con-0818rev.html.

MULTIPLE MODULE COMPUTER SYSTEM AND METHOD

CROSS REFERENCE TO RELATED APPLICATIONS

The present application claims priority as a continuation of U.S. nonprovisional patent application Ser. No. 10/772,214, filed Feb. 3, 2004, which is a continuation of U.S. nonprovisional patent application Ser. No. 09/569,758, filed May 12, 2000 (Now U.S. Pat. No. 6,718,415), which claimed priority to U.S. Provisional Application No. 60/134,122 filed May 14, 1999, commonly assigned, and hereby incorporated by reference.

BACKGROUND OF THE INVENTION

The present invention relates to computing devices. More particularly, the present invention provides a system including a plurality of computer modules that can independently operate to provide backup capability, dual processing, and the like. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use.

Similar to separate desktop and portable computers, there is no commonality between two desktop computers. To date, most personal computers are constructed with a single motherboard that provides connection for CPU and other components in the computer. Dual CPU systems have been available through Intel's slot 1 architecture. For example, two Pentium II cartridges can be plugged into two "slot 1" card slots on a motherboard to form a Dual-processor system. The two CPU's share a common host bus that connects to the rest of the system, e.g. main memory, hard disk drive, graphics subsystem, and others. Dual CPU systems have the advantage of increased CPU performance for the whole system. Adding a CPU cartridge requires no change in operating systems and application software. However, dual CPU systems may suffer limited performance improvement if memory or disk drive bandwidth becomes the limiting factor. Also, dual CPU systems have to time-share the processing unit in running multiple applications. CPU performance improvement efficiency also depends on software coding structure. Dual CPU systems provide no hardware redundancy to help fault tolerance. In running multiple applications, memory and disk drive data throughput will become the limiting factor in improving performance with multi-processor systems.

Thus, what is needed are computer systems that can have multiple computer modules. Each computer module has dedicated memory and disk drive, and can operate independently.

BRIEF SUMMARY OF THE INVENTION

According to the present invention, a technique including a method and device for multi-module computing is provided. In an exemplary embodiment, the present invention provides a system including a plurality of computer modules that can independently operate to provide backup capability, dual processing, and the like.

In a specific embodiment, the present invention provides a computer system for multi-processing purposes. The computer system has a console comprising a first coupling site and a second coupling site, e.g., computer module bay. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

In an alternative specific embodiment, the present invention provides a multi-processing computer system. The system has a console comprising a first coupling site and a second coupling site. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, a mass storage device coupled to the processing unit, and a video output coupled to the processing unit. Each of the computer modules is substantially similar in design to each other to provide independent processing of each of the computer modules in the computer system. A video switch circuit is coupled to each of the computer modules through the video output. The video switch is configured to switch a video signal from any one of the computer modules to a display.

Numerous benefits are achieved using the present invention over previously existing techniques. In one embodiment, the invention provides improved processing and maintenance features. The invention can also provide increased CPU performance for the whole system. The invention also can be implemented without changes in operating system and application software. The present invention is also implemented using conventional technologies that can be provided in the present computer system in an easy and efficient manner.

In another embodiment, the invention provides at least two users to share the same modular desktop system. Each user operates on a different computer module. The other peripheral devices, i.e. CDROM, printer, DSL connection, etc. can be shared. This provides lower system cost, less desktop space and more efficiency. Depending upon the embodiment, one or more of these benefits can be available. These and other advantages or benefits are described throughout the present specification and are described more particularly below.

In still further embodiments, the present invention provides methods of using multiple computer modules.

These and other embodiments of the present invention, as well as its advantages and features, are described in more detail in conjunction with the text below and attached Figures.

DETAILED DESCRIPTION OF THE INVENTION

According to the present invention, a technique including a method and device for multi-module computing is provided. In an exemplary embodiment, the present invention provides a system including a plurality of computer modules that can independently operate to provide backup capability, dual processing, and the like.

Figure 1:
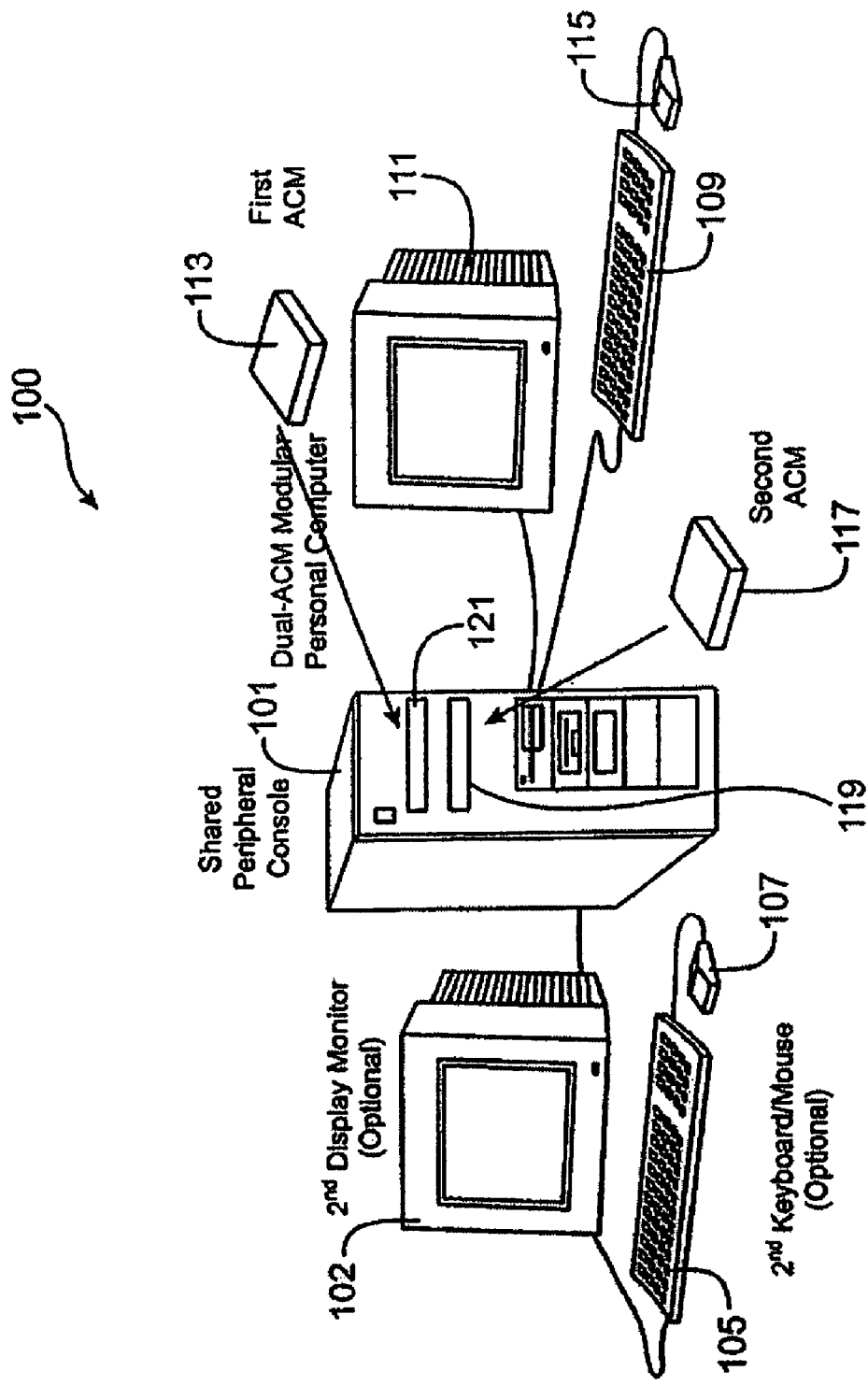
FIG. 1 is a simplified diagram of a computer system according to an embodiment of the present invention.

FIG. 1 is a simplified diagram of a computer system 100 according to an embodiment of the present invention. This diagram is merely an illustration and should not limit the scope of the claims herein. One of ordinary skill in the art would recognize other variations, modifications, and alternatives. The computer system 100 includes an attached computer module (i.e., ACM) 113, a desktop console 101, among other elements. The computer system also has another ACM module 117. Each ACM module has a respective slot 121, 119, which mechanically houses and electrically couples each ACM to the computer console. Also shown is a display 111, which connects to the console. Additionally, keyboard 109 and mouse 115 are also shown. A second display 102, keyboard 105, and mouse 107 can be coupled to the console in some optional embodiments to allow more than one user to operate the computer system. The computer system is modular and has a variety of components that are removable. Some of these components (or modules) can be used in different computers, workstations, computerized television sets, and portable or laptop units.

In the present embodiment, each ACM 113 includes computer components, as will be described below, including a central processing unit ("CPU"), IDE controller, hard disk drive, computer memory, and the like. The computer module bay (i.e., CMB) 121 is an opening or slot in the desktop console. The CMB houses the ACM and provides communication to and from the ACM. The CMB also provides mechanical protection and support to the ACM. The CMB has a mechanical alignment mechanism for mating a portion of the ACM to the console. The CMB further has thermal heat dissipation sinks, electrical connection mechanisms, and the like. Some details of the ACM can be found in co-pending patent application Ser. Nos. 09/149,882 and 09/149,548 filed Sep. 8, 1998, commonly assigned, and hereby incorporated by reference for all purposes.

In a specific embodiment, the present multiple computer module system has a peripheral console that has two or more computer bays that can receive a removable computer module or ACM. Multiple computer module system can function as a personal computer with only one ACM and the peripheral console. The second and additional ACM can be added later to increase overall system performance and reliability. The ACM operates independently as self-contained computer, communicates with each other through a high-speed serial communication and share most peripheral devices within the peripheral console. Each ACM controls its independent graphics subsystem and drives separate video output signals. A practical implementation is a dual ACM system. In a dual ACM system, two monitors can be used to display the two ACMs' graphics outputs at the same time. For a single monitor, a RGB switch is used to switch between the video outputs of the two ACMs and can be controlled by a command from the user. Similarly, input devices (i.e. keyboard and mouse) are switched between the two computer systems with a command from the user. Command from the user can be in the form of either a dedicated key on the keyboard or a special icon on the screen that the mouse can click on.

In most embodiments, the ACM includes an enclosure such as the one described with the following components, which should not be limiting:
1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present system are described in more detail below. In a dual ACM system, the primary ACM can connect directly to the peripheral board in the peripheral console. The second ACM can connect either directly or indirectly to the peripheral board. For indirect connection, a receptacle board is added to allow a cable connection to the peripheral board. This is to facilitate the mechanical positioning of the second ACM inside the computer chassis. The receptacle board approach can even be used for the primary ACM if a high bandwidth peripheral bus, e.g. PCI Bus, is not connected from the primary ACM to the peripheral board.

The shared peripheral console has a chassis and a motherboard that connects the following devices:
1) Input means, e.g. keyboard and mouse,
2) Display means, e.g. RGB monitor,
3) Add-on means, e.g. PCI add-on slots,
4) Two Computer Module Bays (CMB) with connectors to two ACMs,
5) A serial communication Hub controller that interfaces to serial communication controller of both ACMs,
6) Shared storage subsystem, e.g. Floppy drive, CDROM drive, DVD drive, or 2nd Hard Drive,
7) Communication device, e.g. modem,
8) Power supply, and others.

The computer bay is an opening in the peripheral console that receives an ACM. CMB provides mechanical protection to ACM, mechanical alignment for connector mating, mechanical locking system to prevent theft and accidental removal, and connectors at the end of the opening for connecting to ACM. The interface bus between ACM and the peripheral console has a video bus, peripheral connections, serial communication connection, control signals and power connection. Video bus includes video output of graphics devices, i.e. analog RGB and control signals for monitor. Power connection supplies the power for ACM.

Figure 2:
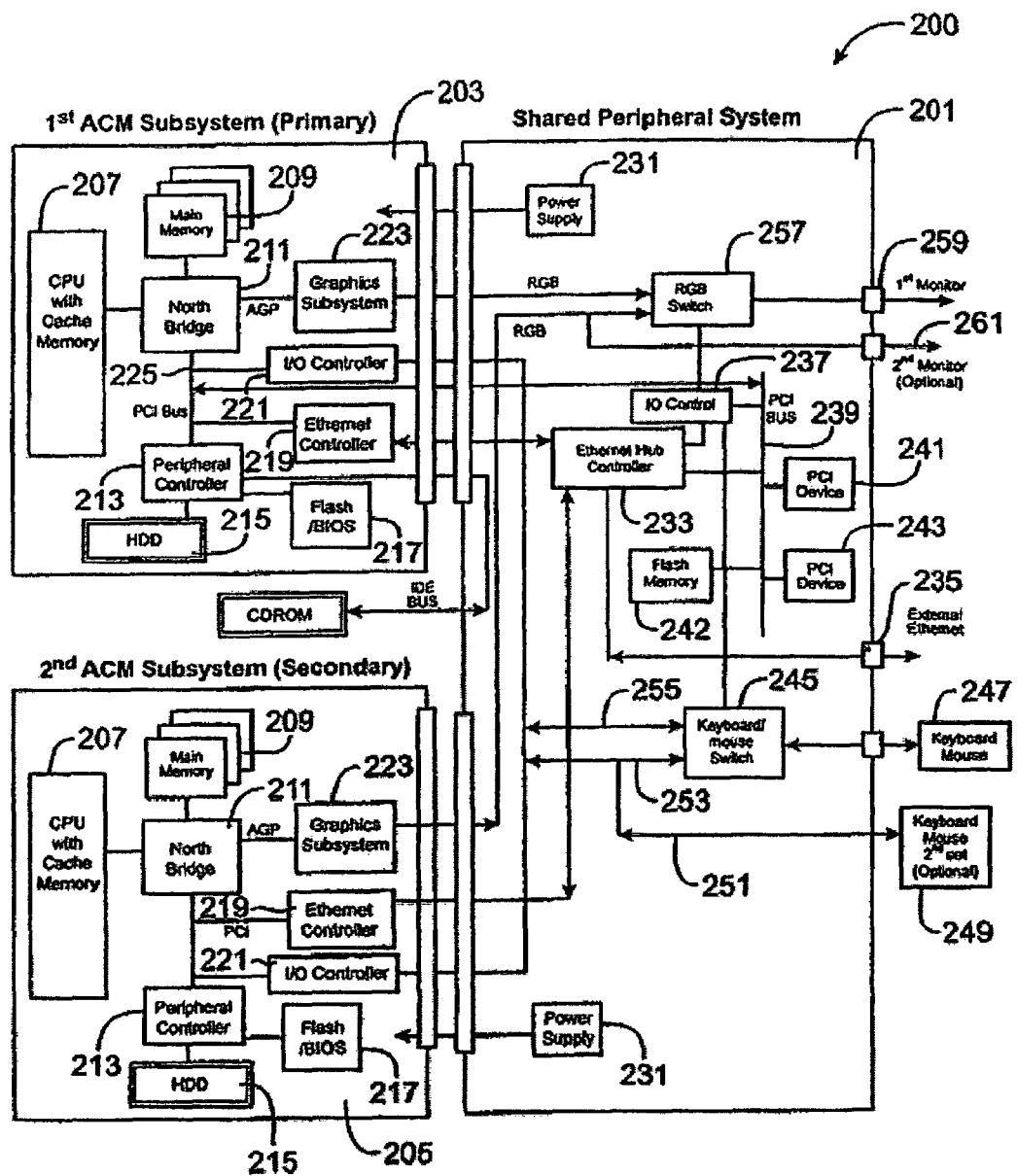
FIG. 2 is a simplified block diagram of a computer system according to an alternative embodiment of the present invention.

An implementation of peripheral sharing is the use of Ethernet controllers to bridge the communication between the two ACMs. Some of the peripheral devices residing in the peripheral console are shown in the simplified diagram of FIG. 2. As shown, the diagram is merely an illustration which should not limit the scope of the claims herein. One of ordinary skill in the art would recognize many other variations, alternatives, and modifications. As shown, a primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

Among other features, the computer system includes an ACM with security protection.

The ACM also has a network controller, which can be an Ethernet controller 219, which is coupled to the North Bridge through the PCI bus. The North Bridge is coupled to the CPU. The Ethernet controller can be a 10/100 Base, such as Intel's 82559 or the like. Other types of network connection devices can also be used. For example, the invention can use Gbit Ethernet 1394, and USB 2.0. The network controller couples to a hub 233 in the console, which includes shared peripheral system 201.

Also shown is the second ACM 205. The second ACM has the same or similar components as the first ACM. Here, like reference numerals have been used for easy cross-referencing, but is not intended to be limiting. In some embodiments, the secondary ACM is not connected to the PCI bus in the peripheral console directly. The secondary ACM 219 accesses peripheral devices controlled by the primary ACM through the Ethernet connection to the primary ACM, e.g. CD-ROM, or PCI modem. The implementation is not restricted to Ethernet serial communication and can use other high-speed serial communication such as USB 2.0, and 1394. The Ethernet hub is coupled to an external output port 235, which connects to an external network.

The primary hard disk drive in each ACM can be accessed by the other ACM as sharable hard drive through the Ethernet connection. This allows the easy sharing of files between the two independent computer modules. The Ethernet Hub Controller provides the high-speed communication function between the two computer modules. Ethernet data bandwidth of 100 Mbit/sec allows fast data communication between the two computer modules. The secondary ACM access peripheral devices of the primary ACM through the network connection provided by Ethernet link. The operating system, e.g. Windows 98, provides the sharing of resources between the two ACMs. In some embodiments, critical data in one ACM can be backup into the other ACM.

The Ethernet hub also couples to PCI bus 239, which connects to PCI devices 241, 243, e.g., modem, SCSI controller. A flash memory 242 can also be coupled to the PCI bus. The flash memory can store passwords and security information, such as those implementations described in U.S. Ser. No. 09/183,493, which is commonly owned, and hereby incorporated by reference. The hub 233 also couples to an I/O control 237, which connects to keyboard/mouse switch 245, which couples to keyboard/mouse 247. Optionally, the keyboard/mouse switch also couples to a second keyboard/house 259 via PS2 or USB signal line 251. The keyboard/mouse switch has at least a first state and a second state, which allow operation of respectively multiple keyboards or a single keyboard. The switch also couples to each I/O controller 221 in each ACM via lines 253, 255. The I/O control 237 also couples to an RGB switch 257, which allows video signals to pass to the first monitor 259. Alternatively, the RGB switch couples to a second monitor 261. The RGB switch includes analog video switches such as MAXIM's MAX4545.

The peripheral system 201 also has an independent power supply 231 for each ACM. Each power supply provides power to each ACM. As merely an example, the power supply is a MICRO ATX 150W made by ENLIGHT, but can be others. The power supply is connected or coupled to each ACM through a separate line, for example. The independent power supply allows for independent operation of each ACM in some embodiments.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 3:
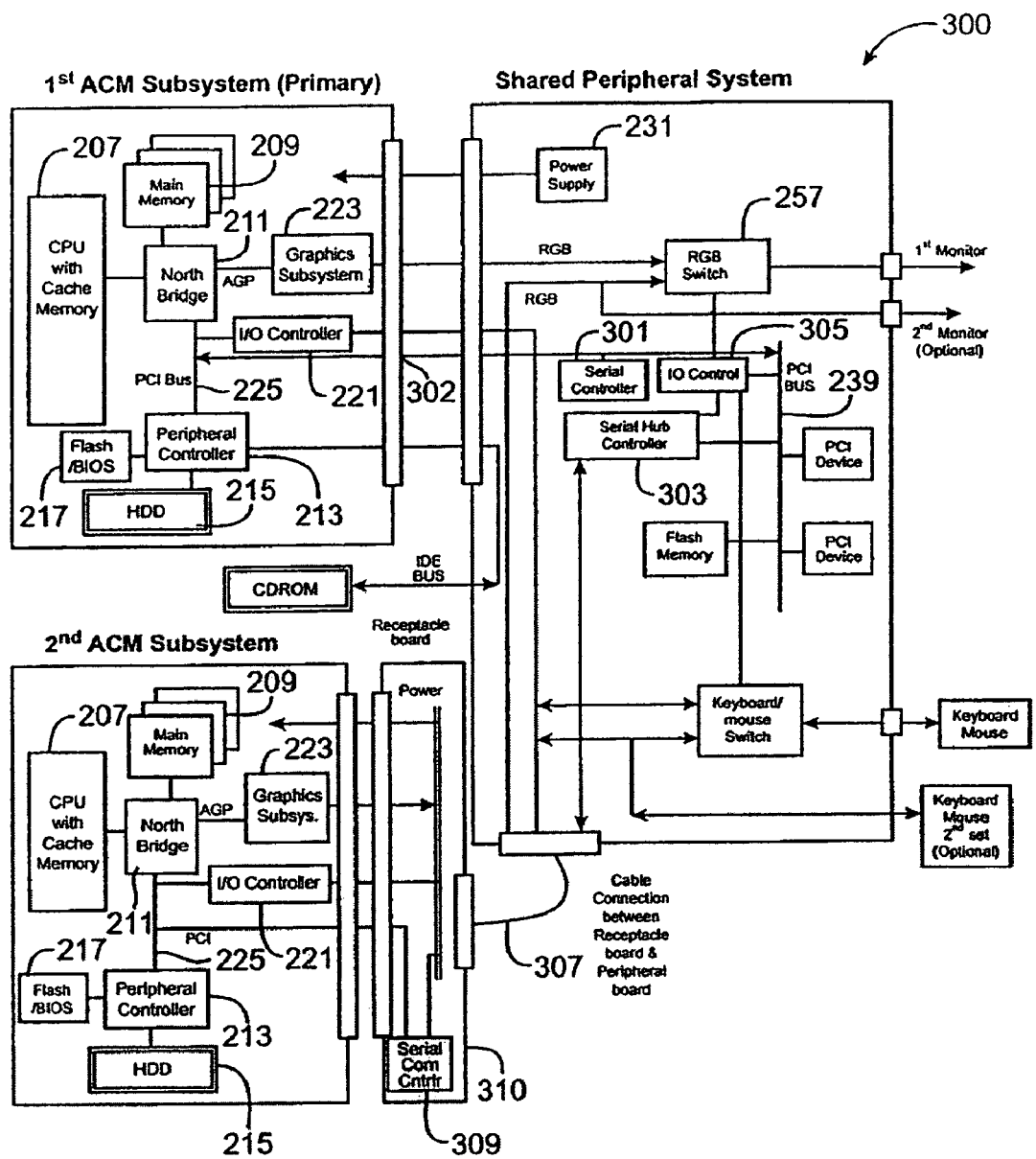
FIG. 3 is a simplified block diagram of a computer system according to a further alternative embodiment of the present invention.

FIG. 3 is a simplified block diagram 300 of a computer system according to an alternative embodiment of the present invention. This diagram is merely an example which should not limit the scope of the claims herein. One of ordinary skill in the art would recognizes many other variations, modifications, and alternatives. Like reference numerals are used in this FIG. as the previous FIGs. for easy referencing, but are not intended to be limiting. As shown, each ACM includes common elements as the previous FIG. A primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

Among other features, the computer system includes an ACM with security protection.

The ACM also has a network controller, which can be coupled to a serial port 302, which is coupled to the PCI bus in the ACM. The serial port is coupled to the peripheral console through a serial controller 301 in the serial console. The serial controller is connected to PCI bus 239. The serial controller is also coupled to a serial hub controller 303, which is coupled to the PCI bus and a second ACM. In a specific embodiment, a receptacle board 310 is added to connect to the second ACM. The purpose of the receptacle board is to allow a cable connection 307 to the peripheral board 300. The cable connection is possible because the signals needed to connect to the peripheral board can be limited to video, I/O, serial communication, and power. The serial communication controller can be placed on the receptacle board and not in the ACM. As shown, the serial bus controller couples to the PCI bus. The receptacle board also couples to power, graphics subsystem, I/O controller, and other elements, which may be on a common bus. The overall operation of the present configuration is similar to the previous one except it operates in serial communication mode.

The Dual ACM system can support different usage models:

1. One user using both ACMs concurrently with 1 or 2 monitors, and a common keyboard/mouse.

2. Two users using the two separate ACMs at the same time with separate monitors and keyboard/mouse. The 2 users share peripherals, e.g., printer, CDROM, and others. The two users share external networking.

To support 1 monitor for both ACMs, a video switch in the peripheral console is used to switch between the video outputs of the two ACMs. The system can be set to support either 1 monitor or 2-monitor mode. The user presses a special key on the keyboard or a special icon on the screen to switch the screen display from one ACM to the other. This same action causes the keyboard and mouse connections to switch from one ACM to the other ACM.

A dual ACM system can save space, wiring, and cost for a 2-person PC setup, with the added benefit that both PC systems can be accessed from one user site for increased system performance if the other user is not using the system. Files can be copied between the primary drive of both system and provides protection against a single ACM failure. Software needs to be developed to manage the concurrent use of two PC subsystems, the automatic sharing of selected files between the two systems, and fault tolerance.

The design with more than two computer modules can be implemented with the use of multi-port, serial communication hub controller and multi-port I/O switches. In one embodiment, a peripheral console has four computer bays for four separate computer modules. The computer modules communicate through a four port Ethernet hub. The video, keyboard, and mouse switch will cycle through the connection from each computer module to the external monitor, keyboard, and mouse with a push button sequentially. This embodiment is useful for a server that performs different functions concurrently, e.g. email, application hosting, web hosting, firewall, etc.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 4:
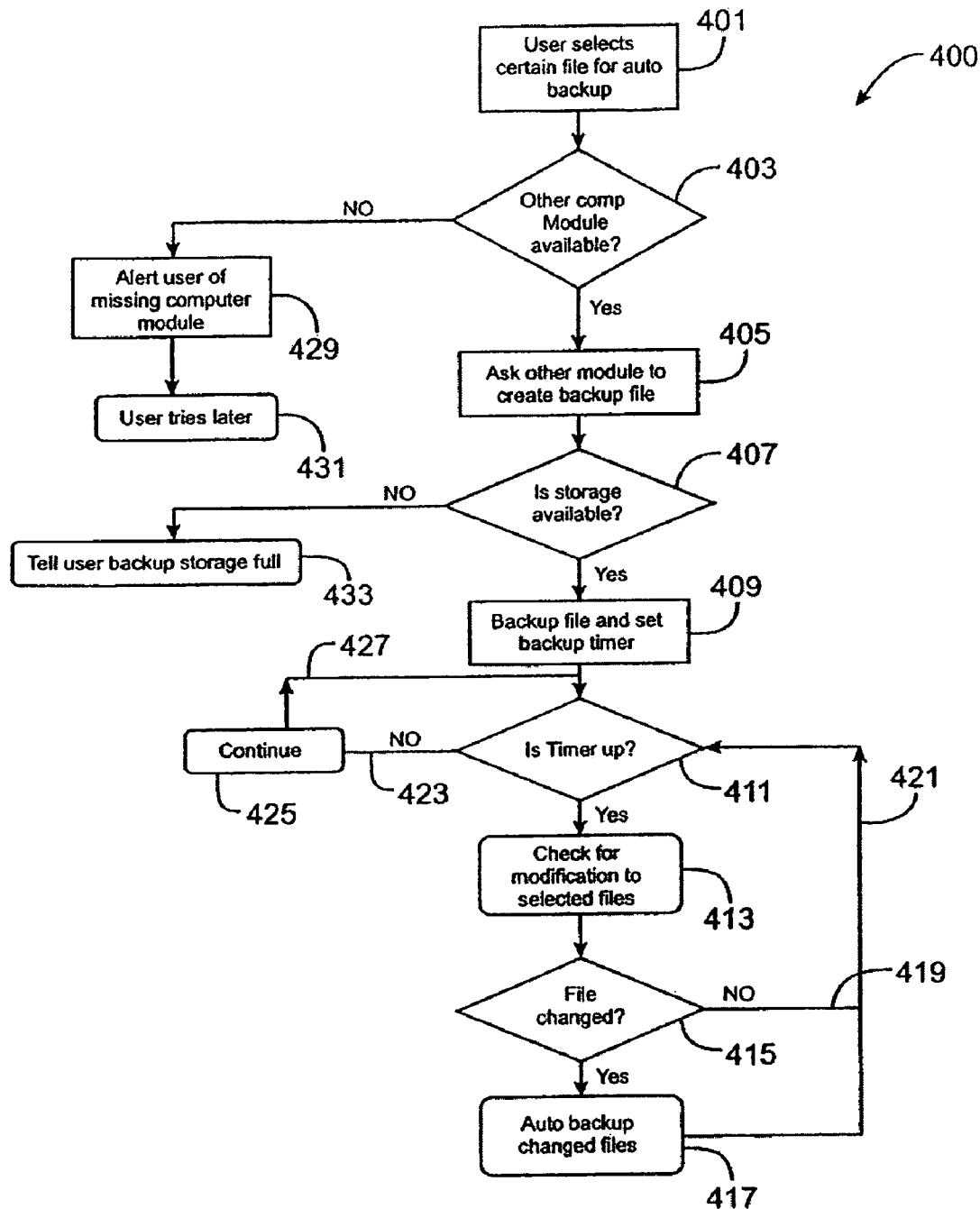
FIG. 4 is a simplified flow diagram of a method according to an embodiment of the present invention.

FIG. 4 is a simplified diagram of a method according to an embodiment of the present invention. This diagram is merely an example which should not limit the scope of the claims herein. One of ordinary skill in the art would recognize many other variations, modifications, and alternatives. The present diagram illustrates an automatic file backup procedure from one computer module to the other. As shown, a user selects (step 401) a certain file in one of the computer module for automatic backup. Next, the method determines if another module is available, step 403. If so, the method in the originating module requests the other computer module to create (step 405) backup file. Alternatively, the method alerts the user of the missing or malfunctioning module, step 429. The method then has the user try later 431, once the missing or malfunctioning module has been replaced or repaired. Next, the method determines if there is sufficient storage available in the other computer module for the backup files. If so, the method goes to the next step. (Alternatively, the method prompts (step 433) a message to the user indicating that the storage is full.) In the next step, the method stores the backup file in memory of the other module. After the backup file has been successfully created (step 409), the software in the originating ACM sets a timer to check (step 411) for file modification via branches 423, 427 through continue, step 425 process. If a file selected for backup has been modified (step 415), then the file is automatically back up to the other ACM again, step 417. Alternatively, the method returns to step 411 through branch 421.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 5:
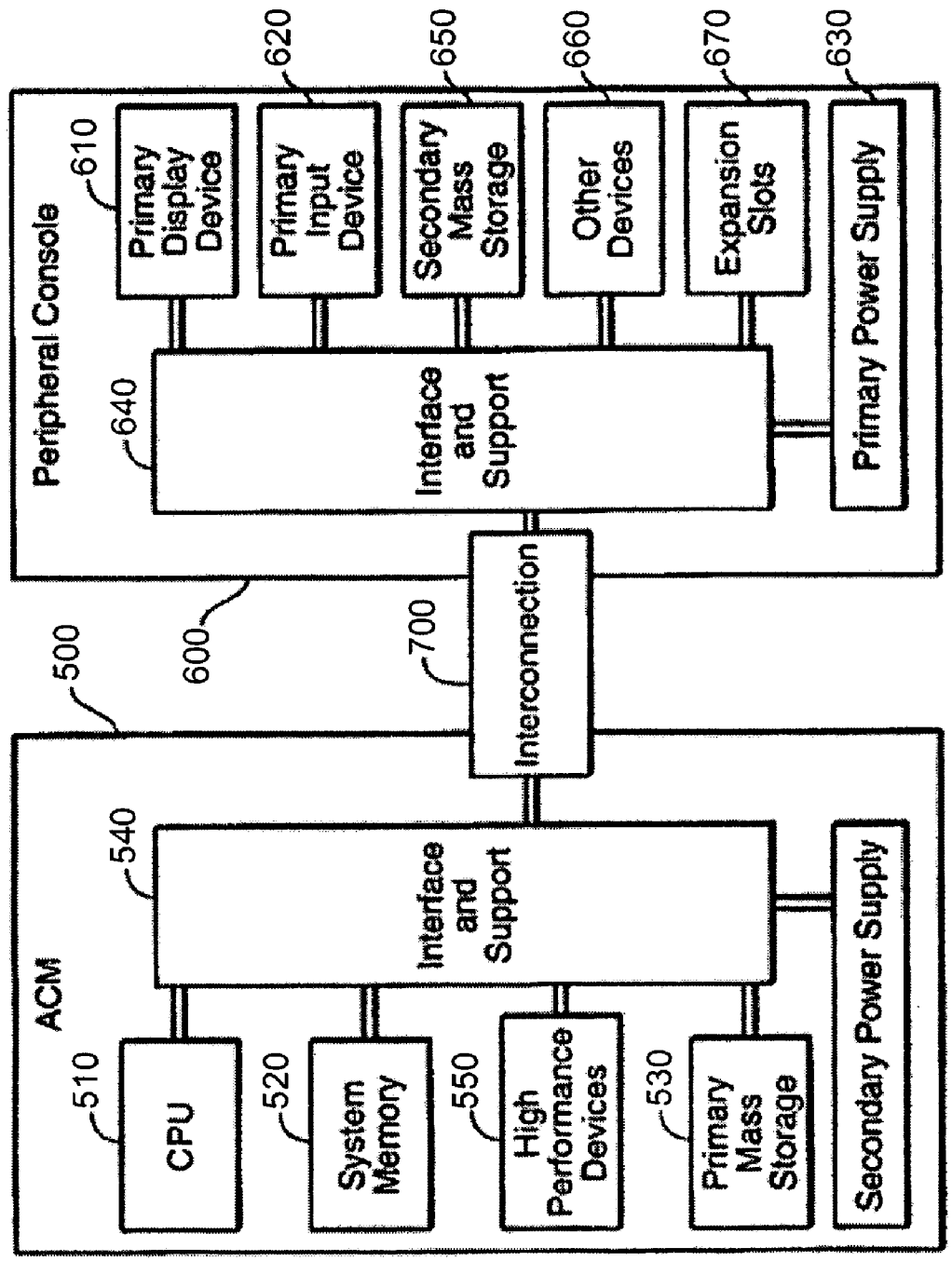
FIG. 5 is a block diagram of one embodiment of a computer system employing the present invention.

FIG. 5 is a block diagram of the components in one computer system employing the present invention. The computer system comprises an attached computer module (ACM), a peripheral console (PCON), and the interconnection apparatus between them. The ACM includes the central processing unit (CPU) 510, system memory 520, high performance devices 550, primary mass storage 530, and related interface and support circuitry 540. The PCON includes primary display 610, primary input 620, secondary mass storage 650, other devices 660, expansion slots 670, the primary power supply 630, and related interface and support circuitry 640. The interconnection apparatus 700 includes circuitry to convey power and operational signals between the ACM and PCON.

Within the ACM 500, the CPU 510 executes instructions and manipulates data stored in the system memory. The CPU 510 and system memory 520 represent the user's core computing power. The core computing power may also include high performance devices 550 such as advanced graphics processor chips that greatly increase overall system performance and which, because of their speed, need to be located close to the CPU. The primary mass storage 530 contains persistent copies of the operating system software, application software, configuration data, and user data. The software and data stored in the primary mass storage device represent the user's computing environment. Interface and support circuitry 540 primarily includes interface chips and signal busses that interconnect the CPU, system memory, high performance devices, and primary mass storage. The interface and support circuitry also connects ACM-resident components with the ACM-to-PCON interconnection apparatus as needed.

Within the PCON 600, the primary display component 610 may include an integrated display device or connection circuitry for an external display device. This primary display device may be, for example, an LCD, plasma, or CRT display screen used to display text and graphics to the user for interaction with the operating system and application software. The primary display component is the primary output of the computer system, i.e., the paramount vehicle by which programs executing on the CPU can communicate toward the user.

The primary input component 620 of the PCON may include an integrated input device or connection circuitry for attachment to an external input device. The primary input may be, for example, a keyboard, touch screen, keypad, mouse, trackball, digitizing pad, or some combination thereof to enable the user to interact with the operating system and application software. The primary input component is the paramount vehicle by which programs executing on the CPU receive signals from the user.

The PCON may contain secondary mass storage 650 to provide additional high capacity storage for data and software. Secondary mass storage may have fixed or removable media and may include, for example, devices such as diskette drives, hard disks, CD-ROM drives, DVD drives, and tape drives.

The PCON may be enhanced with additional capability through the use of integrated "Other Devices" 660 or add-on cards inserted into the PCON's expansion slots 670. Examples of additional capability include sound generators, LAN connections, and modems. Interface and support circuitry 640 primarily includes interface chips, driver chips, and signal busses that interconnect the other components within the PCON. The interface and support circuitry also connects PCON-resident components with the ACM-to-PCON interconnection apparatus as needed.

Importantly, the PCON houses the primary power supply 630. The primary power supply has sufficient capacity to power both the PCON and the ACM 500 for normal operation. Note that the ACM may include a secondary "power supply" in the form, for example, of a small battery. Such a power supply would be included in the ACM to maintain, for example, a time-of-day clock, configuration settings when the ACM is not attached to a PCON, or machine state when moving an active ACM immediately from one PCON to another. The total energy stored in such a battery would, however, be insufficient to sustain operation of the CPU at its rated speed, along with the memory and primary mass storage, for more than a fraction of an hour, if the battery were able to deliver the required level of electrical current at all.

Figure 6:
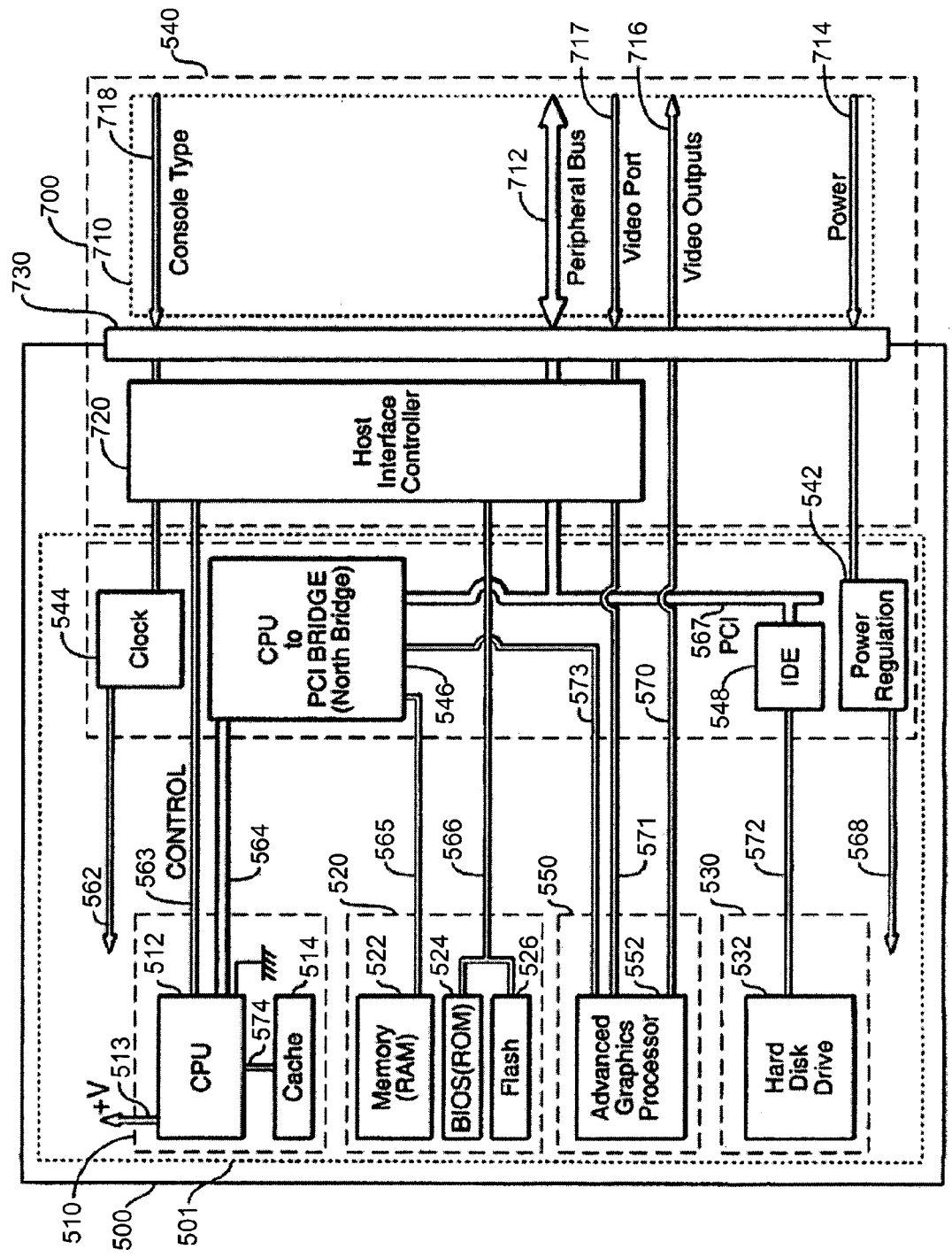
FIG. 6 is a block diagram of an attached computing module (ACM).

FIG. 6 is a block diagram of an attached computing module (ACM) 500. The physical ACM package 500 contains the ACM functional components 501 and the ACM side of the ACM-to-PCON Interconnection 300. The ACM 501 comprises a CPU component 510, a system memory component 520, a primary mass storage component 530, a high performance devices components 550, and an interface and support component 540.

The ACM side of the ACM-to-PCON Interconnection 700 comprises a Host Interface Controller (HIC) component 720 and an ACM connector component 730. The HIC 720 and connector 730 components couple the ACM functional components 800 with the signals of an ACM-to-PCON interface bus 710 used to operatively connect an ACM with a PCON. The ACM-to-PCON interface bus 710 comprises conveyance for electrical power 714 and signals for a peripheral bus 712, video 716, video port 717, and console type 718. The preferred ACM-to-PCON Interconnection 700 is described in detail in a companion U.S. patent application Ser. No. 09/149,882, entitled "A Communication Channel and Interface Devices for Bridging Computer Interface Buses," by the same inventor, filed on the same day herewith, and hereby incorporated by reference. The preferred ACM-to-PCON interconnection 700 includes circuitry to transmit and receive parallel bus information from multiple signal paths as a serial bit stream on a single signal path. This reduces the number of physical signal paths required to traverse the interconnection 700. Further, employing low-voltage differential signaling (LVDS) on the bit stream data paths provides very reliable, high-speed transmission across cables. This represents a further advantage of the present invention.

The CPU component 510 of the ACM functional circuitry 501 of the presently described embodiment comprises a microprocessor 512, which is the chief component of the personal computer system, power supply connection point 513, and cache memory 514 tightly coupled to the microprocessor 512 by the CPU-to-cache bus 574 comprising signal paths for address, data, and control information. The microprocessor 512 of this embodiment is one of the models from the Pentium II family of processors from Intel Corporation. Microprocessor 512 receives electrical power from power bus 568 via connection point 513. Microprocessor 512 couples to the Host Interface Controller (HIC) 720 via CPU-to-HIC bus 563 comprising signal paths to exchange control information such as an interrupt request. Microprocessor 512 also couples to CPU Bridge 546 via CPU main bus 564 comprising signal paths for address, data, and control information.

The CPU Bridge component 546 of the interface and support circuitry 540 operates to couple the high speed CPU main bus 564 to specialty buses of varying speeds and capability that connect other computer components. The CPU Bridge of the presently described embodiment incorporates memory controller circuitry, advanced graphics processor support circuitry, and a general, industry-standard PCI bus controller in a single package. A CPU Bridge 546 such as the 52443LX PCI/AGP Controller from Intel Corporation may be used.

The system memory component 520 of the ACM functional circuitry 501 in the present embodiment comprises main system memory (RAM) 522, BIOS memory 524, and flash memory 526. The system memory 520 is used to contain data and instructions that are directly addressable by the CPU. The RAM 522 comprises volatile memory devices such as DRAM or SDRAM memory chips that do not retain their stored contents when power is removed. This form of memory represents the largest proportion of total system memory 520 capacity. The BIOS memory 524 comprises non-volatile memory devices such as ROM or EPROM memory chips that retain their stored contents regardless of the application of power and are read-only memory under normal operating conditions. The BIOS memory 524 stores, for example, start-up instructions for the microprocessor 512 and sets of instructions for rudimentary input/output tasks. The flash memory 526 comprises non-volatile memory devices that retain their stored contents regardless of the application of power. Unlike the BIOS non-volatile memory, however, the stored contents of the flash memory 526 are easily changed under normal operating conditions. The flash memory 526 may be used to store status and configuration data, such as security identifiers or ACM specifications like the speed of the microprocessor 512. Some embodiments may combine the BIOS functions into the flash memory device, thus permitting BIOS contents to be rewritten, improving field upgradability.

The main system memory (RAM) 522 is coupled to memory controller circuitry resident within the CPU Bridge 546 via direct memory bus 565. The BIOS 524 and flash memory 526 are coupled to HIC 720 via switched memory bus 566. This permits the BIOS 524 and flash 526 memories to be accessed by circuitry in the HIC 720 or other circuitry connected thereto. The direct memory bus 565 and the switch memory bus 566 each comprises conductors to convey signals for data, address, and control information.

The primary mass storage component 530 of the ACM functional circuitry 501 in the present embodiment comprises a compact hard disk drive with an industry-standard, IDE interface. The hard disk drive (HDD) 532 has a formatted storage capacity sufficient to contain an operating system for the computer, application software desired by the user, and related user configuration and operating parameter data. The HDD 532 in the present embodiment serves as the "boot" device for the personal computer from which the operating system is loaded into RAM 522 by the start-up program stored in the BIOS 524.

The present HDD 532 has a capacity of approximately 6,000 megabytes to provide adequate storage for common software configurations and reasonable space for user data. One example of a common software configuration includes the Windows 95 operating system from Microsoft Corporation, a word processing program, a spreadsheet program, a presentation graphics program, a database program, an email program, and a web browser such as Navigator from Netscape Corporation. The hard disk 532 stores program and data files for each software component, including files distributed by the vendor as well as files created or updated by operation of the software after it is installed. For example, a word processor program may maintain information about a user's identity and latest preferences in an operating system registry file. Or, for example, the web browser may maintain a file of the user's favorite web sites or most recently viewed web pages. An HDD with 6000 megabyte capacity is readily available in the small size of hard disk (e.g., 6.5-inch or 7.5-inch) to minimize the space required within the ACM for the primary mass storage device 530.

The HDD 532 is coupled to IDE controller circuitry 548 via IDE bus 572. The IDE controller circuitry 548 is coupled to the CPU Bridge 546 via the Host PCI bus 567. IDE controllers and busses, and the PCI bus are well known and understood in the industry. The above components operate together to couple the hard disk drive 532 to the microprocessor 512.

The high performance devices component 550 of the ACM functional circuitry 501 in the present embodiment comprises an Advanced Graphics Processor (AGP) 552. The Model 740 Graphics Device from Intel Corporation may be used in the present embodiment as the AGP.

Increases in computer screen size, graphics resolution, color depth, and visual motion frame rates, used by operating system and application software alike, have increased the computing power required to generate and maintain computer screen displays. An AGP removes a substantial portion of the graphics computing burden from the CPU to the specialized high-performance processor, but a high level of interaction between the CPU and the specialized processor is nonetheless required. To maximize the effective contribution of having a specialized processor in the presently described embodiment, the AGP 552 is located in the ACM 500, where it is in close proximity to the microprocessor 512. The AGP 552 is coupled to the microprocessor 512 via the advanced graphics port bus 573 of the CPU Bridge 546. The visual display signal generated by the AGP are conveyed toward actual display devices at the peripheral console (PCON) via video signal bus 570. Video information from a source external to the ACM and appearing as video port signals 717 may be conveyed to the AGP 552 via video port signal path 571.

Other types of high performance components may be included in different ACM configurations. For example, an interface to an extremely high speed data communication facility may be desirable in some future computer where CPU-to-network interaction is of comparable intensity to today's CPU-to-graphics interaction. Because such high performance components tend to be high in cost, their inclusion in the ACM is desirable. Inclusion of high cost, high performance components in the ACM concentrates a user's core computing power and environment in a portable package. This represents a further advantage of the invention.

The interface and support component 540 of the ACM functional circuitry 501 in the present embodiment comprises circuitry for power regulation 542, clocking 544, CPU Bridge 546, IDE controller 548, and signal conveyance paths 561–174. The CPU Bridge 546 couples the CPU component 510 of the ACM 500 with the other components of the ACM 520–150 and the CPU-to-PCON Interconnection 700. The CPU Bridge 546 and IDE controller 548 have already been discussed. Power regulation circuitry 542 receives electrical power via the electrical power conduction path 714 of the CPU-to-PCON Interconnection 700, conditions and distributes it to the other circuitry in the ACM using power distribution bus 568. Such regulation and distribution is well known and understood in the art.

Clocking circuitry 544 generates clock signals for distribution to other components within the ACM 500 that require a timing and synchronization clock source. The CPU 510 is one such component. Often, the total power dissipated by a CPU is directly proportional to the frequency of its main clock signal. The presently described embodiment of the ACM 500 includes circuitry that can vary the frequency of the main CPU clock signal conveyed to the CPU via signal path 562, in response to a signal received from the host interface controller (HIC) 720 via signal path 561. The generation and variable frequency control of clocking signals is well understood in the art. By varying the frequency, the power consumption of the CPU (and thus the entire ACM) can be varied.

The variable clock rate generation may be exploited to match the CPU power consumption to the available electrical power. Circuitry in the host interface controller (HIC) 720 of the presently described embodiment adjusts the frequency control signal sent via signal path 561 to the clocking circuitry 544, based on the "console type" information signal 718 conveyed from the peripheral console (PCON) by the CPU-to-PCON interconnection 700. In this arrangement, the console type signal originating from a desktop PCON would result in the generation of a maximum speed CPU clock. The desktop PCON, presumably has unlimited power from an electrical wall outlet and does not need to sacrifice speed for power conservation. The console type signal originating from a notebook PCON would, however, result in the generation of a CPU clock speed reduced from the maximum in order to conserve battery power and extend the duration of computer operation obtained from the energy stored in the battery. The console type signal originating from a notepad PCON would result in the generation of a CPU clock speed reduced further yet, the notepad PCON presumably having smaller batteries than the notebook PCON. Inclusion of control signals and circuitry to effect a CPU clock signal varying in frequency according to characteristics of the PCON to which the ACM is connected facilitates the movement of the user's core computing power and environment to different work settings, which is a further advantage of the present invention.

Figure 8:
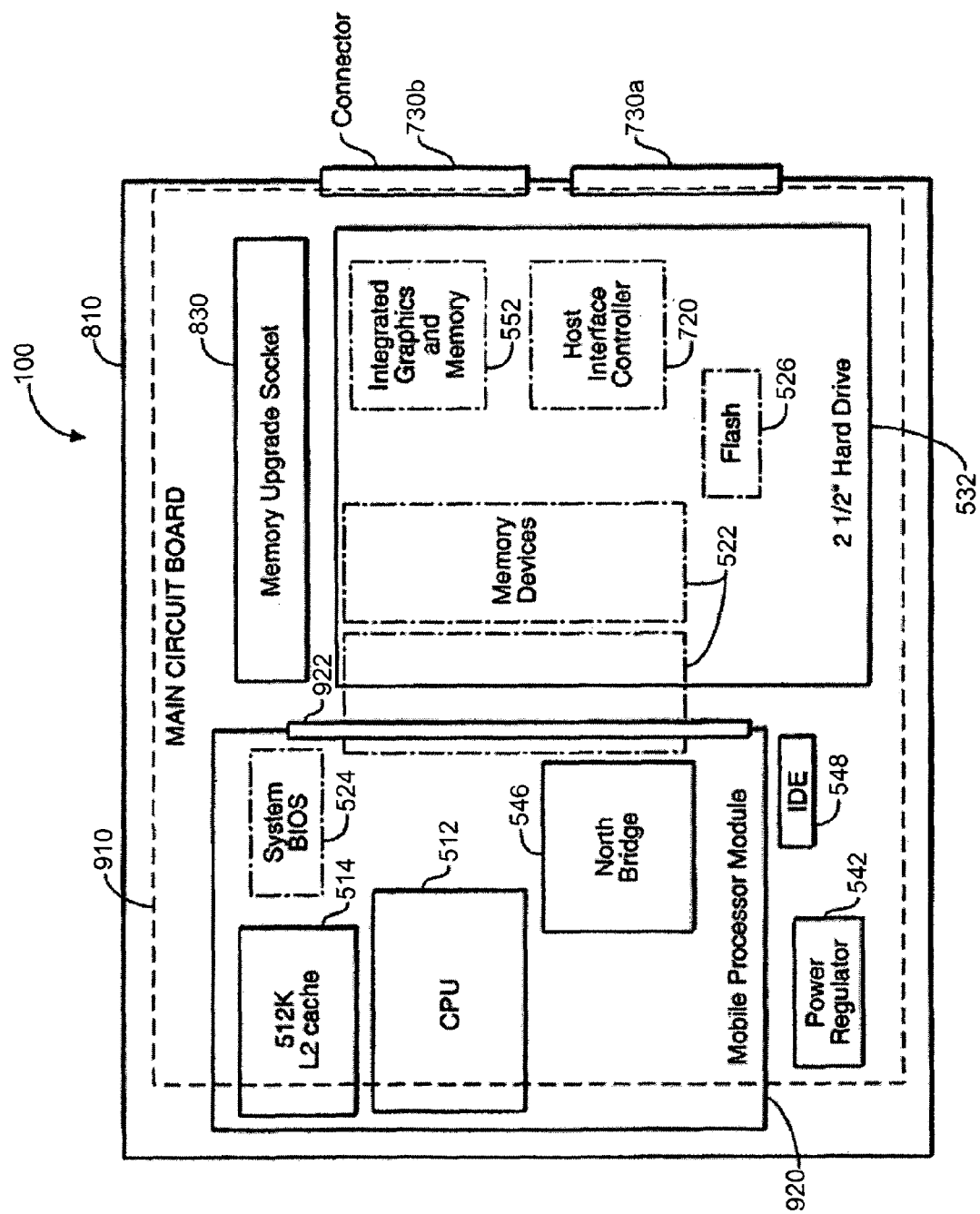
FIG. 8 illustrates the internal component layout for one embodiment of an ACM.
Figure 9:
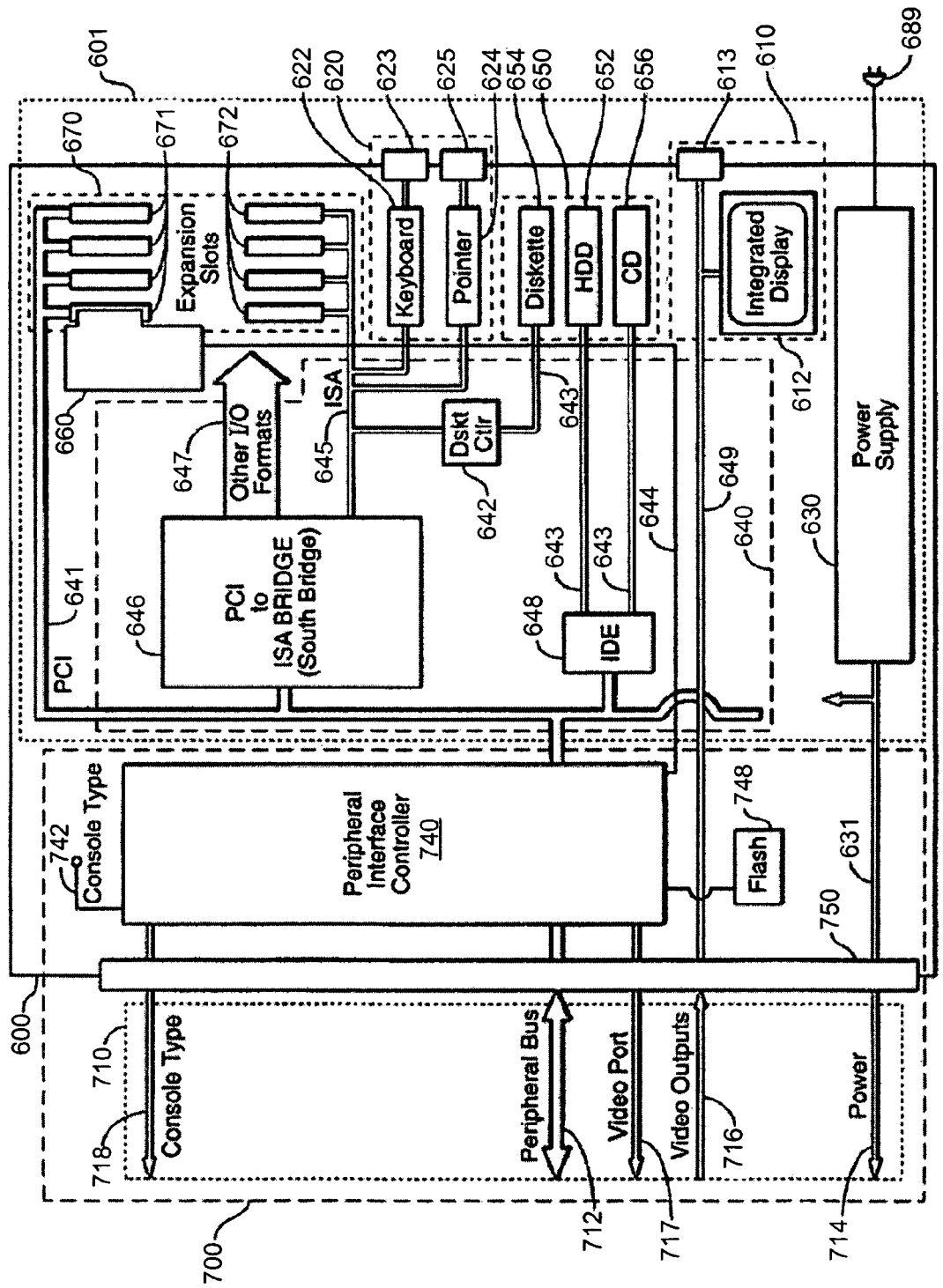
FIG. 9 is a block diagram of a peripheral console (PCON).

FIG. 9 illustrates an external view of one embodiment of an ACM. The case 810 of the ACM 500 is generally rectangular in shape, preferably constructed of a strong, lightweight, rigid material that will protect the internal components from mechanical and environmental exposure. Plastics may readily be used to construct the case 810. The case 810 completely surrounds the internal components, being generally an 8-sided box. FIG. 8 shows the top 812, right 814, and rear 816 surfaces of the ACM case 810. Rear edges 818 of the case joining the rear surface 816 with its adjoining surfaces may be beveled or rounded to facilitate insertion of the ACM 500 into the computer bay of the PCON. Notches 840 may be formed by projecting small surfaces inward from otherwise generally flat surfaces of the ACM case 810. The notches 840 may be used to engage with mechanical devices mounted in and about a computer bay. Such mechanical devices can be employed to secure the ACM into position within a computer bay for reliability and security. Openings 817 are formed into the rear surface 816 of the ACM case 810 through which to project connectors 530a and 530b. In one embodiment the case 810 is approximately 5.75 inches wide by 6.5 inches deep by 1.6 inches high.

Connectors 730a and 730b are part of the ACM-to-PCON Interconnection as described earlier in reference to FIGS. 5 and 6. When the ACM 500 is inserted into the computer bay of a peripheral console (PCON), connectors 730a and 730b mate with corresponding connectors located at the rear of the computer bay to electrically couple the ACM with the PCON containing the computer bay. Details concerning the ACM-to-PCON Interconnection can be found in the U.S. patent application entitled "A Communication Channel and Interface Devices for Bridging Computer Interface Buses," already incorporated herein by reference. The connectors 730a and 730b used in one embodiment are connectors complying with the Device Bay industry standard as documented in "Device Bay Interface Specification," revision 0.85, Feb. 6, 1998. Such connectors have specifically been designed to stand up to the rigors of repeated insertion and withdrawal.

Cooling plate 830 forms part of the top surface 812 of ACM 500. The cooling plate 830 may be mounted to, or project through an opening formed in, case 810. Similarly, electromagnetic interference (EMI)/electrostatic discharge (ESD) grounding plate 832 forms part of the right surface 814 of ACM 500. The grounding plate 832 may be mounted to, or project through an opening formed in, case 810. Cooling plate 830 and grounding plate 832 compressively mate with counterparts when the ACM is fully inserted into the computer bay. The counterparts located along the boundaries of the computer bay conduct dangerous heat and electrical charges away from the ACM. Inside the ACM, cooling plate 830 thermally couples to heat-sensitive components such as CPU 810 by methods well known in the art. Similarly, grounding plate 832 electrically couples to EMI/ESD-sensitive components, such as a microprocessor, by methods well known in the art.

LCD display 850 forms part of the right surface 814 of ACM 500. The LCD display may be mounted to, or project through an opening formed in, case 810. The LCD display may contain indicators about the status of the ACM. Such indicators may display, for example, the time-of-day from a time-of-day clock contained within the ACM, or the amount of charge remaining in an ACM-resident battery, or certain configuration options recorded in flash memory. The LCD display 850 provides display capability for a limited amount of information, most useful when the ACM is separated from a PCON (and is thus separated from a full-capability, primary display device).

In one embodiment, the weight of an inserted ACM is largely borne by the bottom side of a computer bay frame. Alternative embodiments are possible where, for example, the weight of the ACM is borne by rails running longitudinally down the right and left sides of the computer bay cavity that engage corresponding grooves running longitudinally down the right and left sides of an ACM.

FIG. 8 illustrates the internal component layout for one embodiment of an ACM. All components are contained within the confines of the ACM case 510, except for connectors 730a and 730b which extend from the rear of the ACM 500 to engage mating connectors (not shown) that will couple the ACM circuitry with the PCON circuitry. Main circuit board 910 provides electrical connections for circuitry within the ACM and mounting for many of its components 524, 522, 526, 552, 542148, 720, and 730. The fabrication and use of such circuits boards is well known and understood in the art. Connector 922 is also mounted on main circuit board 910 and mates with mobile processor module 920. Mobile processor module 920 represents a form of packaging for a microprocessor and related components. The illustrated mobile processor module 920 is a self-contained unit that includes a microprocessor 512, CPU cache 514, and CPU bridge 546 operatively interconnected by the manufacturer. An example of one such module is the Pentium Processor with MMX Technology Mobile Module from Intel Corporation (order number 24 7515-001, September 5997). One skilled in the art recognizes that discrete microprocessor, cache, and bridge could have been employed and mounted directly to the main circuit board.

The mobile processor module 920 blocks the view, from the top, of the system BIOS 524. Similarly, hard disk drive 532 hides RAM memory 522, the high performance graphics processor 552, the host interface controller 720, and flash memory 526. Memory upgrade socket 930 remains exposed to facilitate installation of additional RAM memory 522. Power regulator 542, like the memory upgrade socket, enjoys a generous amount of overhead clearance to accommodate its vertical size. The area including IDE controller 548 also enjoys overhead clearance to facilitate a cable connection with the hard disk drive 532.

The functional interconnection and operation of components contained within the ACM and depicted in FIG. 8 has already been described in relation to FIG. 6 for like numbered items appearing therein.

Figure 7:
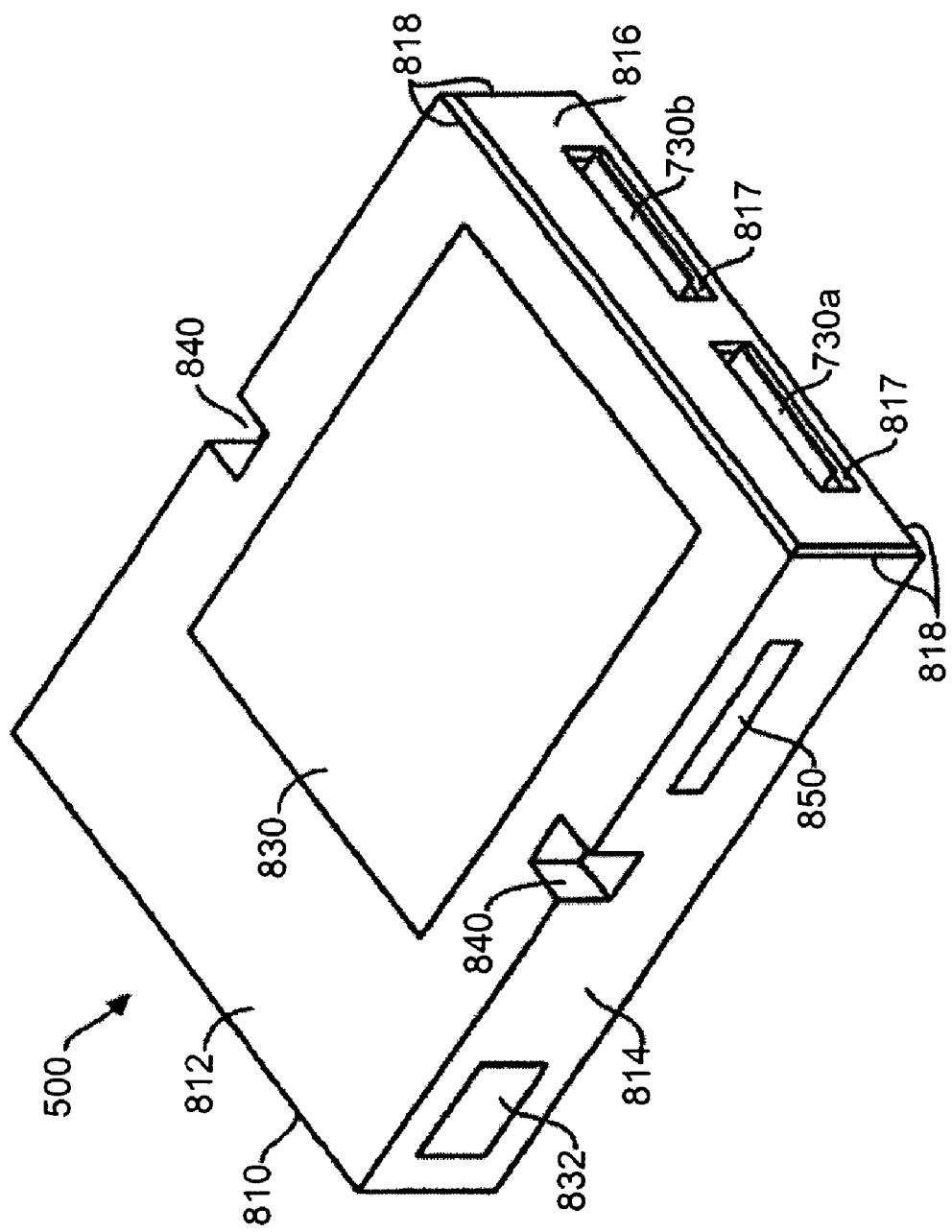
FIG. 7 illustrates an external view of one embodiment of an ACM.

FIG. 7 is a block diagram of a peripheral console (PCON). A peripheral console couples with an ACM to form an operating personal computer system. The peripheral console (PCON) supplies an ACM with primary input, display, and power supply; the ACM supplies the core computing power and environment of the user. In the presently described embodiment the physical PCON package 600 contains the PCON functional components 601 and the PCON side of the ACM-to-PCON Interconnection 700. The PCON functional components 601 comprise primary display 610, a primary input 620, a primary power supply 630, interface and support 640, secondary mass storage 650, other devices 660, and expansion slots 670.

The PCON side of the ACM-to-PCON Interconnection 700 comprises a Peripheral Interface Controller (PIC) component 740, a PCON connector component 750, console-type component 742, and flash memory device 748. The PIC 740 and connector 750 components couple the PCON functional components 201 with the signals of an ACM-to-PCON interface bus 710 used to operatively connect an ACM with a PCON. The ACM-to-PCON interface bus 710 comprises conveyance for electrical power 714 and signals for a peripheral bus 712, video 716, video port 717, and console-type 718. The preferred ACM-to-PCON Interconnection 700 is described in detail in the U.S. patent application entitled "A Communication Channel and Interface Devices for Bridging Computer Interface Buses," already incorporated herein by reference.

Connector component 750 may be selected to mate directly with the connector component 730 of an ACM (shown in FIG. 6). Alternatively, connector component 750 may be selected to mate with, for example, the connector on one end of a cable intervening between the PCON and an ACM in a particular embodiment. The ACM-to-PCON interconnection described in the aforementioned companion patent application has the advantage of providing reliable signal conveyance across low cost cables.

Flash memory device 748 provides non-volatile storage. This storage may be accessible to devices in both the ACM and the PCON, including the host interface controller and the peripheral interface controller to which it is connected. As such, flash memory 748 may be used to store configuration and security data to facilitate an intelligent mating between an ACM and a PCON that needs no participation of the CPU.

The primary display component 610 of the PCON functional circuitry 601 of the presently described embodiment comprises integrated display panel 612 and video connector 613. Integrated display panel 612 is a color LCD display panel having a resolution of 640 horizontal by 480 vertical pixels. 640-by-480 resolution is popularly considered to be the minimum screen size to make practical use of the application software in widespread use today. One skilled in the art recognizes that the type and resolution of the display can vary greatly from embodiment to embodiment, depending on factors such as cost and intended application. Any display device may be used, without departing from the scope and spirit of the invention, that provides principal visual output to the computer user for operating system and application software executing in its customary and intended fashion using the CPU component (510 of FIG. 3) of an ACM presently coupled to PCON 600.

Integrated display panel 612 is coupled to video signal bus 649 and displays a screen image in response to video signals presented on bus 649. Certain pins of connector 750 receive video output signals 716 of the ACM-to-PCON interface bus 710 from a mated connector that is coupled to an ACM. These certain pins of connector 750 couple to video signal bus 649 which conveys the video output signals 716 throughout the PCON 600 as needed. Video connector 613 is exposed at the exterior of PCON 600 and couples to video signal bus 649. Connector 613 permits easy attachment of an external display device that is compatible with the signals carried by bus 649, such as a CRT monitor (not shown). The external display device may be used in addition, or as an alternative, to integrated display panel 612.

The isolation of the relatively heavy and sizable primary display 610 from the core computing power and user environment contained within an ACM represents a further advantage of the present invention.

The primary input component 620 of the PCON functional circuitry 601 of the presently described embodiment comprises keyboard interface circuitry 622, keyboard connector 623, pointer interface circuitry 624, and pointer connector 625. Keyboard interface circuitry 622 and pointer interface circuitry 624 connect to ISA bus 645 and are thereby coupled to the CPU component (510 of FIG. 3) of any ACM attached to PCON 600. Keyboard interface circuitry 622 interfaces a standard computer keyboard (not shown), attached at connector 623, to ISA bus 645. Pointer interface circuitry 622 interfaces a standard computer pointing device (not shown), such as a computer mouse attached at connector 625, to ISA bus 645. Computer keyboards, pointing devices, connectors 623, 625, keyboard interface circuitry 622, and pointer interface circuitry 624 are well known in the art. The isolation of the relatively heavy and sizable primary input devices 620 from the core computing power and user environment contained within an ACM represents a further advantage of the present invention.

The primary power supply component 630 of the PCON functional circuitry 601 of the presently described embodiment provides electrical energy for the sustained, normal operation of the PCON 600 and any ACM coupled to connector 750. The power supply may be of the switching variety well known in the art that receives electrical energy from an AC source 689, such as a wall outlet. Power supply 630 reduces the alternating current input voltage, to a number of distinct outputs of differing voltages and current capacities. The outputs of power supply 630 are applied to power bus 631. Power bus 631 distributes the power supply outputs to the other circuitry within the PCON 600. Bus 631 also connects to certain pins of connector 350 to provide the electrical power 714 for an ACM conveyed by ACM-to-PCON interconnection 700. The isolation of the usually heavy power supply 630 from the core computing power and user environment contained within the ACM represents a further advantage of the present invention.

The interface and support component 640 of the PCON functional circuitry 601 of the presently described embodiment comprises peripheral bridge 646, diskette controller 642, IDE controller 648, and signal conveyance paths 641, 643, 644, 645, 647 and 649. Peripheral bridge 646 couples PCI peripheral bus 641 with peripheral busses of other formats such as ISA peripheral bus 645 and others 647. PCI and ISA peripheral busses are industry standards, well known and understood in the art. Other peripheral busses 647 may include, for example, a bus compliant with the universal serial bus (USB) industry standard. While other embodiments of a peripheral console 600 may include a single peripheral bus that is coupled to an attached ACM via ACM-to-PCON interconnection 700, such as PCI bus 641, this embodiment includes peripheral bridge 646 to establish additional busses 645, 647. The additional busses 645, 647 permit the use of the many low-cost and readily available components compatible with these bus specifications.

Diskette controller 642 interfaces a floppy disk drive 654 with the CPU component 110 of an attached ACM (shown in FIG. 4) so that the CPU may control and use the diskette drive 654 hardware to store and retrieve data. Diskette controller 642 couples to the CPU via a connection to ISA bus 645. Diskette controller 642 connects to the diskette drive 654 via one of device cables 643.

Similarly, IDE controller 648 interfaces a hard disk drive 652 and a CDROM drive 656 with the CPU component 510 of an attached ACM (shown in FIG. 6) so that the CPU may control and use the hard disk drive 652 and CDROM 656 hardware to store and retrieve data. IDE controller 648 couples to the CPU via connection to PCI peripheral bus 641. IDE controller 648 connects to each of hard disk drive 652 and CD-ROM drive 656 via one of device cables 643. Some embodiments of PCON 600 may take advantage of VLSI integrated circuits such as an 82371 SB (PIIX4) integrated circuit from Intel Corporation. An 82371 SB integrated circuit includes circuitry for both the peripheral bridge 646 and the IDE controller 648 in a single package.

The secondary mass storage component 650 of the PCON functional circuitry 601 of the presently described embodiment comprises diskette drive 654, hard disk drive 652, and CD-ROM drive 656. Secondary mass storage 650 generally provides low-cost, non-volatile storage for data files which may include software program files. Data files stored on secondary mass storage 650 are not part of a computer user's core computing power and environment. Secondary mass storage 650 may be used to store, for example, seldom used software programs, software programs that are used only with companion hardware devices installed in the same peripheral console 600, or archival copies of data files that are maintained in primary mass storage 550 of an ACM (shown in FIG. 6). Storage capacities for secondary mass storage 650 devices may vary from the 1.44 megabytes of the 3.5-inch high density diskette drive 654, to more than 10 gigabytes for a large format (5-inch) hard disk drive 652. Hard disk drive 652 employs fixed recording media, while diskette drive 654 and CD-ROM drive 656 employ removable media. Diskette drive 654 and hard disk drive 652 support both read and write operations (i.e., data stored on their recording media may be both recalled and modified) while CD-ROM drive 656 supports only read operations.

The other devices component 660 of the PCON functional circuitry 601 of the presently described embodiment comprises a video capture card. A video capture card accepts analog television signals, such as those complying with the NTSC standard used for television broadcast in the United States, and digitizes picture frames represented by the analog signal for processing by the computer. Video capture cards at present are considered a specialty, i.e., not ubiquitous, component of personal computer systems. Digitized picture information from video capture card 660 is carried via signal conveyance path 644 to the peripheral interface controller 740 which transforms it to the video port signals 317 of the ACM-to-PCON interconnection 700 for coupling to the advanced graphics processor 152 in an attached ACM (shown in FIG. 6).

Video capture card 660 is merely representative of the many types of "other" devices that may be installed in a PCON to expand the capabilities of the personal computer. Sound cards and laboratory data acquisition cards are other examples. Video capture card 660 is shown installed in one of expansion slots 670 for coupling to the interface and control circuitry 640 of the PCON. Any of other devices 660 could be coupled to the interface and control circuitry 640 of the PCON by different means, such as direct installation on the circuit board that includes the interface and control circuitry 640; e.g., a motherboard.

The expansion slots component 670 of the PCON functional circuitry 601 of the presently described embodiment comprises PCI connectors 671 and ISA connectors 672. A circuit card may be inserted into one of the connectors 671, 672 in order to be operatively coupled with the CPU 510 of an attached ACM (shown in FIG. 6). Each of connectors 671 electrically connects to PCI bus 641, and may receive and hold a printed circuit card which it electrically couples to PCI bus 641. Each of connectors 672 electrically connects to ISA bus 645, and may receive and hold a printed circuit card which it electrically couples to ISA bus 645. The PCI 641 and ISA 645 busses couple to the CPU 110 of an attached ACM (shown in FIG. 4) by circuitry already described.

Various modifications to the preferred embodiment can be made without departing from the spirit and scope of the invention. (A limited number of modifications have already been described in the preceding discussion.) For example, a particular embodiment may insert another layer of bus bridging between the CPU bridge and the Peripheral bridge. This may be desirable if, for example, a vendor wants to implement a proprietary, general-purpose bus having intermediate performance characteristics that fall between those of the high-performance general purpose bus originating at the CPU, and the slower general purpose PCI bus. Thus, the foregoing description is not intended to limit the invention as set forth.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer system comprising:
    a console comprising a power supply, a first coupling site and a second coupling site, each coupling site comprising a connector and a slot, the console being a first enclosure housing
    the coupling sites,
    a serial communication controller powered by the power supply,
    more than two computer modules; each computer module coupled to one of the coupling site through the connector and the slot, comprising
        a second enclosure,
        a processing unit,
        a main memory coupled to the processing unit, and
        a graphics controller;

and a mass storage device coupled to one of the computer modules;

wherein each of the computer modules is substantially similar in design to each other and operates fully independent of each other; and wherein one of the computer modules is configured to provide protection against failure of any one of the other computer modules; and wherein the mass storage device is powered by the console.

2. The computer system of claim 1 wherein each computer module further comprises a communication controller coupled to the serial communication controller in the console adapted to transfer data between any two of the computer modules and to an external network.

3. The computer system of claim 1 wherein each computer module further comprises a grounding plate for shielding electromagnetic interference (EMI).

4. The computer system of claim 1 wherein the computer module further comprises circuitry that can vary the clock frequency of the processing unit for varying its power consumption.

5. The computer system of claim 1 comprising four or more computer modules.

6. A computer system comprising:
a console comprising a power supply, a first coupling site and a second coupling site, each coupling site comprising a connector and a slot, the console being an enclosure housing
the coupling sites,
an Ethernet controller coupled to an external network and powered by the power supply,
more than two computer modules; each computer module coupled to one of the coupling site through the connector and the slot, comprising
a processing unit,
a main memory coupled to the processing unit, and
a network controller coupled to the Ethernet controller through the connector of the coupling site;
and a mass storage device coupled to one of the computer modules;
wherein each of the computer modules is substantially similar in design to each other; and wherein one of the computer modules is configured to provide protection against failure of any one of the other computer modules; and wherein the mass storage device is powered by the console.

7. The computer system of claim 6 wherein the Ethernet controller in the console adapted to transfer data between any two of the computer modules and to an external network.

8. The computer system of claim 6 wherein each computer module further comprises a grounding plate for shielding electromagnetic interference (EMI).

9. The computer system of claim 6 wherein the computer module further comprises circuitry that can vary the clock frequency of the processing unit for varying its power consumption.

10. The computer system of claim 1 comprising four or more computer modules.

11. A computer system comprising:
a console comprising an Ethernet hub controller, a first coupling site and a second coupling site, each coupling site comprising a connector and a slot, the console being a first enclosure housing
the Ethernet hub controller,
each coupling site,
a plurality of computer modules, each coupled to one of the coupling sites through the connector and the slot;
each computer module comprising
a processing unit,
a main memory coupled to the processing unit,
circuitry that can vary the clock frequency of the processing unit for varying its power consumption, and
an Ethernet controller coupled to the Ethernet hub controller through the connector of the coupling site for communication between the computer modules; and
a mass storage device coupled to one of the computer modules;
and wherein each of the computer modules operates fully independent of each other; and wherein one of the computer modules is configured to provide protection against failure of another of the computer modules; and wherein the mass storage device is powered by the console.

12. The computer system of claim 11 wherein the Ethernet hub controller in the console adapted to transfer data between the computer modules and an external network.

13. The computer system of claim 11 wherein each computer module further comprises a grounding plate for shielding electromagnetic interference (EMI).

14. The computer system of claim 11 wherein the computer module's primary input circuitry couples to input devices through the console only.

15. The computer system of claim 11 wherein the computer module further comprises a second enclosure with grooves running down the sides, for engaging with rails running down the computer bay of the console upon insertion.

16. A computer system comprising:
a console comprising a video switch, a first coupling site and a second coupling site, each coupling site comprising a connector and a slot; the console being a first enclosure housing
each coupling site,
an Ethernet controller coupled to an external network,
a plurality of computer modules; each computer module coupled to one of the coupling sites through the connector and the slot, and comprising
a power supply,
a processing unit,
a main memory coupled to the processing unit, and
a graphics controller coupled to the video switch; and
a mass storage device coupled to one of the computer modules;
wherein each of the computer modules operates fully independent of each other.

17. The computer system of claim 16 wherein the Ethernet controller in the console adapted to transfer data between the computer modules and an external network.

18. The computer system of claim 16 wherein each computer module further comprises a grounding plate for shielding electromagnetic interference (EMI).

19. The computer system of claim 16 wherein the computer module further comprises circuitry that can vary the clock frequency of the processing unit for varying its power consumption.

20. The computer system of claim 16 wherein the computer module further comprises a second enclosure with grooves running down the sides, for engaging with rails running down the computer bay of the console upon insertion.

21. A computer system comprising:
a console comprising a video, switch, a first coupling site and a second coupling site, each coupling site comprising a connector and a slot; the console being a first enclosure housing
the video switch,
each coupling site,
an Ethernet hub controller coupled to an external network, and
a plurality of computer modules; each computer module coupled to one of the coupling sites through the connector and the slot, and comprising
a processing unit,
a main memory coupled to the processing unit; and
a graphics controller coupled to the video switch;
wherein each of the computer modules operates fully independent of each other; and wherein one of the computer modules is configured to provide protection against failure of another of the computer modules; and wherein the video output of the graphics controller couples to a display only through the console.

22. The computer system of claim 21 wherein the Ethernet hub controller in the console adapted to transfer data between the computer modules and an external network.

23. The computer system of claim 21 wherein each computer module further comprises a grounding plate for shielding electromagnetic interference (EMI).

24. The computer system of claim 21 wherein the computer module further comprises circuitry that can vary the clock frequency of the processing unit for varying its power consumption.

25. The computer system of claim 21 wherein the computer module further comprises a second enclosure with grooves running down the sides, for engaging with rails running down the computer bay of the console upon insertion.

26. A computer system comprising:
a console comprising an Ethernet hub controller, a first coupling site and a second coupling site, each coupling site comprising a connector and a slot, the console being a first enclosure housing
the Ethernet hub controller,
each coupling site, and
a plurality of computer modules; each computer module coupled to one of the coupling sites through the connector and the slot, and comprising
a processing unit,
a main memory coupled to the processing unit,
a graphics controller,
a mass storage device, and
an Ethernet controller coupled to the Ethernet hub controller through the connector of the coupling site for communication between the computer modules;
wherein each of the computer modules operates independent of each other, and wherein one of the computer modules can replace another one of the computer modules in operation; and wherein the video output of the graphics controller couples to a display only through the console.

27. The computer system of claim 26 wherein each computer module is coupled to a keyboard or a mouse only through the console.

28. The computer system of claim 26 wherein the SCSI hard disk drive is removable while the computer module is in operation.

29. The computer system of claim 26 wherein each computer module further comprises a grounding plate for shielding electromagnetic interference (EMI).

30. The computer system of claim 26 wherein the computer module further comprises circuitry that can vary the clock frequency of the processing unit for varying its power consumption.

31. A computer system comprising:
a console comprising an Ethernet controller coupled to an external network, a keyboard/mouse multi-port switch, a first coupling site and a second coupling site, each coupling site comprising a connector and a slot, the console being an enclosure housing
the Ethernet controller,
each coupling site, and
more than two computer modules, each coupled to one of the coupling sites through the connector and the slot; each computer module comprising
an enclosure
a power supply,
a processing unit,
a main memory coupled to the processing unit, and
a network controller coupled to the Ethernet controller through the connector of the coupling site for communication between the computer modules;
wherein each of the computer modules operates fully independent of each other; and wherein one of the computer modules is configured to provide protection against failure of any one of the multitude of computer modules; and wherein the computer module couples to a console keyboard based on a command from a user sent to the keyboard/mouse multi-port switch.

32. The computer system of claim 31 wherein each computer module further comprises a grounding plate for shielding electromagnetic interference (EMI).

33. The computer system of claim 31 wherein the computer module further comprises circuitry that can vary the clock frequency of the processing unit for varying its power consumption.

34. The computer system of claim 31 comprising four or more computer modules.

35. The computer system of claim 31 wherein the command from the user is in the form of either a key on the keyboard or an icon on the screen that the mouse can click on.

36. A computer system comprising:
a console comprising a keyboard/mouse multi-port switch, a power supply, a first coupling site and a second coupling site, each coupling site comprising a connector and a slot, the console being an enclosure housing
each coupling site,
a serial communication controller coupled to an external network and power by the console, and
a plurality of computer modules, each coupled to one of the coupling sites through the connector and the slot; each computer module comprising
a processing unit,
a main memory coupled to the processing unit,
a keyboard input, and
a communication controller coupled to the serial communication controller through the connector of the coupling site for communication between the computer modules;
wherein each of the computer modules operates fully independent of each other; and wherein the keyboard input couples to a keyboard based on a command from a user sent to the keyboard/mouse multi-port switch.

37. The computer system of claim 36 wherein each computer module further comprises a grounding plate for shielding electromagnetic interference (EMI).

38. The computer system of claim 36 wherein the computer module further comprises circuitry that can vary the clock frequency of the processing unit for varying its power consumption.

39. The computer system of claim 36 wherein the computer module further comprises of an enclosure with grooves running down the sides, for engaging with rails running down the computer bay of the console upon insertion.

40. The computer system of claim 36 wherein the command from the user is in the form of either a key on the keyboard or an icon on the screen that the mouse can click on.

41. A computer system comprising:
a console comprising a keyboard/mouse multi-port switch, a video switch coupled to a display, a first coupling site, a second coupling site, each coupling site comprising a connector, the console being a first enclosure that is capable of housing
each coupling site,
a serial communication hub controller coupled to an external network, and
a plurality of computer modules inserted into said console; each computer module coupled to one of the connectors of the console and comprising,
a processing unit,
a communication controller coupled to the serial communication hub controller through the connector of the coupling site to support communication with the other modules,
a main memory coupled to the processing unit, and
a graphics controller coupled to the video switch;
wherein each of the computer modules provide independent processing in the computer system; and wherein one of the computer modules is configured to provide protection against failure of another of the plurality of computer modules.

42. The computer system of claim 41 wherein each computer module further comprises a grounding plate for shielding electromagnetic interference (EMI).

43. The computer system of claim 41 wherein the computer module further comprises circuitry that can vary the clock frequency of the processing unit for varying its power consumption.

44. The computer system of claim 41 wherein the computer module further comprises a second enclosure with grooves running down the sides, for engaging with rails running down the computer bay of the console upon insertion.

45. The computer system of claim 41 wherein the console further comprises a hard disk drive coupled to the computer module.

46. A computer system comprising:
a console comprising a power supply, a universal serial bus (USB), a first coupling site, and a second coupling site, each coupling site comprising a connector and a slot, the console being a first enclosure housing
each coupling site,
an Ethernet controller powered by the power supply and coupled to an external network,
a plurality of computer modules, each coupled to one of the coupling sites through the connector and the slot; each computer module comprising
a processing unit,
a main memory coupled to the processing unit,
circuitry that can vary the clock frequency of the processing unit for varying its power consumption, and
a network controller coupled to the Ethernet controller through the connector of the coupling site to support communication with the external network;
wherein each of the computer modules operates fully independent of each other; and wherein one of the computer modules can replace another one of the computer modules in operation.

47. The computer system of claim 46 wherein each computer module further comprises a grounding plate for shielding electromagnetic interference (EMI).

48. The computer system of claim 46 wherein primary input circuitry of the computer module couples to input devices through the console only.

49. The computer system of claim 46 wherein the computer module further comprises a second enclosure with grooves running down the sides, for engaging with rails running down the computer bay of the console upon insertion.

50. The computer system of claim 46 wherein the console further comprises a video switch.

51. A computer system comprising:
a console comprising an Ethernet hub controller, a universal serial bus (USB), a first coupling site and a second coupling site, each coupling site comprising a connector and a slot, the console being a first enclosure housing
the Ethernet hub controller,
the coupling sites, and
more than two computer modules; each computer module coupled to one of the coupling site through the connector and the slot, comprising
a processing unit,
a graphics controller,
a main memory coupled to the processing unit, and
an Ethernet controller coupled to the Ethernet hub controller through the connector of the coupling site for communication between the computer modules;
wherein each of the computer modules operates fully independent of each other; and wherein one of the computer modules is configured to provide protection against failure of any one of the multitude of computer modules.

52. The computer system of claim 51 wherein each computer module further comprises a grounding plate for shielding electromagnetic interference (EMI).

53. The computer system of claim 51 wherein the computer module further comprises circuitry that can vary the clock frequency of the processing unit for varying its power consumption.

54. The computer system of claim 51 comprising four or more computer modules.

55. The computer system of claim 51 wherein the console further comprises a video switch.

56. A computer system comprising:
a console comprising a video switch, a universal serial bus (USB), a first coupling site and a second coupling site, each coupling site comprising a connector and a slot, the console being a first enclosure housing
the coupling sites,
an Ethernet hub controller, and
a plurality of computer modules, each coupled to one of the coupling sites through the connector and the slot; each computer module comprising
a processing unit,
a graphics controller coupled to the video switch, a main memory coupled to the processing unit, and
an Ethernet controller coupled to the Ethernet hub controller for communication between the computer modules;

wherein each of the computer modules operates fully independent of each other.

57. The computer system of claim 56 wherein each computer module further comprises a grounding plate for shielding electromagnetic interference (EMI).

58. The computer system of claim 56 wherein the computer module further comprises circuitry that can vary the clock frequency of the processing unit for varying its power consumption.

59. The computer system of claim 56 wherein the computer module further comprises of an enclosure with grooves running down the sides, for engaging with rails running down the computer bay of the console upon insertion.

60. The computer system of claim 56 wherein the console further comprises a hard disk drive coupled to the computer module.

61. A computer system comprising:
a console comprising an Ethernet controller coupled to an external network, a universal serial bus (USB), a first coupling site and a second coupling site, each coupling site comprising a connector and a slot, the console being a first enclosure housing
a video switch,
each coupling site, and
a plurality of computer modules; each computer module coupled to one of the coupling sites through the connector and the slot; each computer module comprising
a grounding plate for shielding electromagnetic interference (EMI),
a processing unit,
a main memory coupled to the processing unit, and
a graphics controller coupled to the video switch;

wherein each of the computer modules operates fully independent of each other; and wherein the video output of the graphics controller couples to a display only through the console.

62. The computer system of claim 61 wherein primary input circuitry of the computer module couples to input devices through the console only.

63. The computer system of claim 61 wherein the computer module further comprises circuitry that can vary the clock frequency of the processing unit for varying its power consumption.

64. The computer system of claim 61 wherein the computer module further comprises a second enclosure with grooves running down the sides, for engaging with rails running down the computer bay of the console upon insertion.

65. The computer system of claim 61 wherein the console further comprises of a hard disk drive coupled to the computer module.

66. A computer system comprising:
a console comprising a universal serial bus (USB), a first coupling site and a second coupling site, each coupling site comprising a connector and a slot, the console being a first enclosure housing
each coupling site,
a serial communication hub controller, and
a plurality of computer modules; each computer module coupled to one of the coupling sites through the connector and the slot and each computer module comprising
a processing unit,
a main memory coupled to the processing unit,
a SCSI hard disk drive, and
a communication controller coupled to the serial communication hub controller through the connector of the coupling site for communication between the computer modules;

wherein each of the computer modules operates independent of each other.

67. The computer system of claim 66 wherein each computer module further comprises a grounding plate for shielding electromagnetic interference (EMI).

68. The computer system of claim 66 wherein the computer module further comprises circuitry that can vary the clock frequency of the processing unit for varying its power consumption.

69. The computer system of claim 66 wherein the computer module further comprises a second enclosure with grooves running down the sides, for engaging with rails running down the computer bay of the console upon insertion.

70. The computer system of claim 66 wherein the console further comprises a hard disk drive coupled to the computer module.

71. A computer system comprising:
a console comprising a universal serial bus (USB), a first coupling site, and a second coupling site, each coupling site comprising a connector and a slot; the console being a first enclosure housing
each coupling site,
a serial communication controller coupled to an external network, and
a plurality of computer modules; each computer module coupled to one of the coupling sites through the connector and the slot and each computer module comprising
a processing unit,
a main memory coupled to the processing unit,
a communication controller coupled to the serial communication controller to support communication with the external network, and
a cooling plate thermally coupled to the processing unit;

wherein each of the computer modules operates fully independent of each other; and wherein one of the computer modules can replace another one of the computer modules in operation.

72. The computer system of claim 71 wherein each computer module further comprises a grounding plate for shielding electromagnetic interference (EMI).

73. The computer system of claim 71 wherein the computer module further comprises circuitry that can vary the clock frequency of the processing unit for varying its power consumption.

74. The computer system of claim 71 wherein the computer module further comprises of a second enclosure with grooves running down the sides, for engaging with rails running down the computer bay of the console upon insertion.

75. The computer system of claim 71 wherein the console further comprises a hard disk drive coupled to the computer module.

76. A computer system comprising:
a console comprising a video switch, a first coupling site and a second coupling site, each coupling site comprising a connector and a slot, the console being a first enclosure housing
each coupling site, an Ethernet hub controller, and a plurality of computer modules; each computer module coupled to one of the coupling sites through the connector and the slot and each computer module comprising a processing unit, a main memory coupled to the processing unit, a cooling plate thermally coupled to the processing unit, and an Ethernet controller coupled to the Ethernet hub controller through the connector of the coupling site for communication between the computer modules;

wherein each of the computer modules operates fully independent of each other.

77. The computer system of claim 76 wherein each computer module further comprises a grounding plate for shielding electromagnetic interference (EMI).

78. The computer system of claim 76 wherein the computer module further comprises circuitry that can vary the clock frequency of the processing unit for varying its power consumption.

79. A computer system comprising:

a console comprising a power supply, a first coupling site, and a second coupling site, each coupling site comprising a connector and a slot, the console being an enclosure housing each coupling site, an Ethernet controller powered by the power supply and coupled to an external network, and a plurality of computer modules; each computer module coupled to one of the coupling sites through the connector and the slot and each computer module comprising a processing unit, a main memory coupled to the processing unit, primary input circuitry, circuitry that can vary the clock frequency of the processing unit for varying its power consumption, and a network controller coupled to the Ethernet controller through the connector of the coupling site to support communication with the external network;

wherein each of the computer modules operates fully independent of each other; and wherein the primary input circuitry couples to input devices through the console only; and wherein one of the computer modules is configured to provide protection against failure of another of the plurality of computer modules.

80. The computer system of claim 79 wherein each computer module further comprises a grounding plate for shielding electromagnetic interference (EMI).

* * * * *

(12) INTER PARTES REEXAMINATION CERTIFICATE (811th)
United States Patent
Chu

(10) Number: US 7,146,446 C1
(45) Certificate Issued: Jan. 29, 2014

(54) MULTIPLE MODULE COMPUTER SYSTEM AND METHOD

(75) Inventor: William W. Y. Chu, Los Altos, CA (US)

(73) Assignee: Acqis LLC, McKinney, TX (US)

Reexamination Request:
No. 95/001,328, Mar. 19, 2010

Reexamination Certificate for:
Patent No.: 7,146,446
Issued: Dec. 5, 2006
Appl. No.: 11/113,401
Filed: Apr. 22, 2005

Related U.S. Application Data

(63) Continuation of application No. 10/772,214, filed on Feb. 3, 2004, now Pat. No. 7,099,981, which is a continuation of application No. 09/569,758, filed on May 12, 2000, now Pat. No. 6,718,415.

(60) Provisional application No. 60/134,122, filed on May 14, 1999.

(51) Int. Cl.
*G06F 13/00* (2006.01)

(52) U.S. Cl.
USPC ........... 710/301; 709/227; 709/248; 710/313; 710/315; 710/63; 710/72

(58) Field of Classification Search
None
See application file for complete search history.

(56) References Cited

To view the complete listing of prior art documents cited during the proceeding for Reexamination Control Number 95/001,328, please refer to the USPTO's public Patent Application Information Retrieval (PAIR) system under the Display References tab.

*Primary Examiner* — Majid A. Banankhah

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

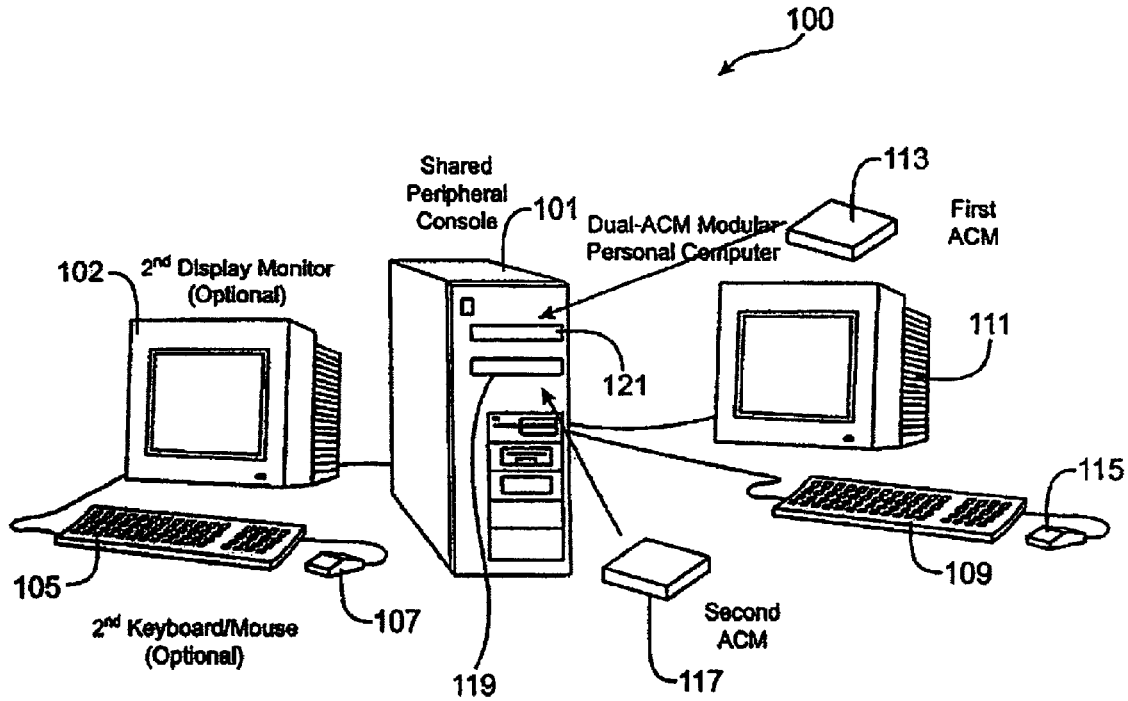

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-80 are cancelled.

\* \* \* \* \*